United States Patent
Matsumoto et al.

(10) Patent No.: US 9,822,822 B2
(45) Date of Patent: Nov. 21, 2017

(54) DRIVE APPARATUS AND BELT UNIT FOR IMAGE FORMING APPARATUS

(71) Applicant: CANON KABUSHIKI KAISHA, Tokyo (JP)

(72) Inventors: Norihiro Matsumoto, Yokohama (JP); Takeo Kawanami, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/375,841

(22) Filed: Dec. 12, 2016

(65) Prior Publication Data
US 2017/0089400 A1    Mar. 30, 2017

Related U.S. Application Data

(63) Continuation of application No. 14/962,188, filed on Dec. 8, 2015, now Pat. No. 9,546,693.

(30) Foreign Application Priority Data

Dec. 12, 2014   (JP) ................ 2014-252048

(51) Int. Cl.
| | |
|---|---|
| G03G 21/16 | (2006.01) |
| F16H 7/02 | (2006.01) |
| F16D 1/108 | (2006.01) |
| F16D 1/08 | (2006.01) |
| G03G 15/16 | (2006.01) |

(52) U.S. Cl.
CPC .......... *F16D 1/108* (2013.01); *F16D 1/0894* (2013.01); *G03G 15/1615* (2013.01);
(Continued)

(58) Field of Classification Search
CPC .......... G03G 15/0173; G03G 15/1615; G03G 15/757; G03G 21/1647; G03G 21/1676;
(Continued)

(56) References Cited

U.S. PATENT DOCUMENTS

| | | |
|---|---|---|
| 5,154,412 A | 10/1992 | Iseda |
| 5,891,534 A | 4/1999 | Sabin et al. |

(Continued)

FOREIGN PATENT DOCUMENTS

| | | |
|---|---|---|
| EP | 1 710 632 A1 | 10/2006 |
| JP | 2007-24085 A | 2/2007 |

(Continued)

OTHER PUBLICATIONS

Search Report issued in European Patent Application No. 15199141.1, dated May 3, 2016.

*Primary Examiner* — Anh T. N. Vo
(74) *Attorney, Agent, or Firm* — Fitzpatrick, Cella, Harper & Scinto

(57) ABSTRACT

A drive apparatus, including: a first rotary member; a second rotary member, which is provided with an axle hole, and which receives drive power from the first rotary member or transmits drive power to the first rotary member; an axle member, which is inserted into the axle hole and engages with the first rotary member so as to transmit drive power between the first rotary member and the second rotary member; and a coupling member for coupling the first rotary member and the second rotary member; wherein the coupling member is provided with a sliding portion which is disposed between the first rotary member and the second rotary member in the radial direction and which slides over either one of the first rotary member and the second rotary member when the first rotary member and the second rotary member rotate integrally with each other via the axle member.

17 Claims, 18 Drawing Sheets

(52) U.S. Cl.
CPC ..... *G03G 21/1647* (2013.01); *B65H 2404/16* (2013.01); *B65H 2801/09* (2013.01); *B65H 2801/12* (2013.01); *F16H 7/02* (2013.01); *G03G 2221/1657* (2013.01)

(58) Field of Classification Search
CPC ........... G03G 21/1668; G03G 21/1695; G03G 2221/1657; G03G 21/168; F16D 1/0894; F16D 1/108; B65H 9/106; B65H 11/002; B65H 16/023; B65H 2801/09; B65H 2801/12
See application file for complete search history.

(56) References Cited

U.S. PATENT DOCUMENTS

| | | |
|---|---|---|
| 6,512,656 B1 | 1/2003 | Matsumoto et al. |
| 6,692,100 B2 | 2/2004 | Steinfield et al. |
| 8,529,017 B2 | 9/2013 | Kersey et al. |
| 9,546,693 B2* | 1/2017 | Matsumoto ........... F16D 1/0894 |
| 2003/0103780 A1 | 6/2003 | Hoashi |
| 2003/0189614 A1 | 10/2003 | Steinfield et al. |
| 2007/0140754 A1 | 6/2007 | Poxon et al. |
| 2013/0216275 A1 | 8/2013 | Morioka et al. |
| 2014/0147168 A1 | 5/2014 | Morioka et al. |
| 2015/0282355 A1* | 10/2015 | Wang ................... H05K 5/0234 |
| | | 361/679.59 |
| 2016/0011560 A1 | 1/2016 | Iijima et al. |

FOREIGN PATENT DOCUMENTS

| | | |
|---|---|---|
| JP | 2008-268927 A | 11/2008 |
| JP | 2009-228824 A | 10/2009 |
| JP | 2014-115535 A | 6/2014 |
| JP | 2014-186299 A | 10/2014 |

* cited by examiner

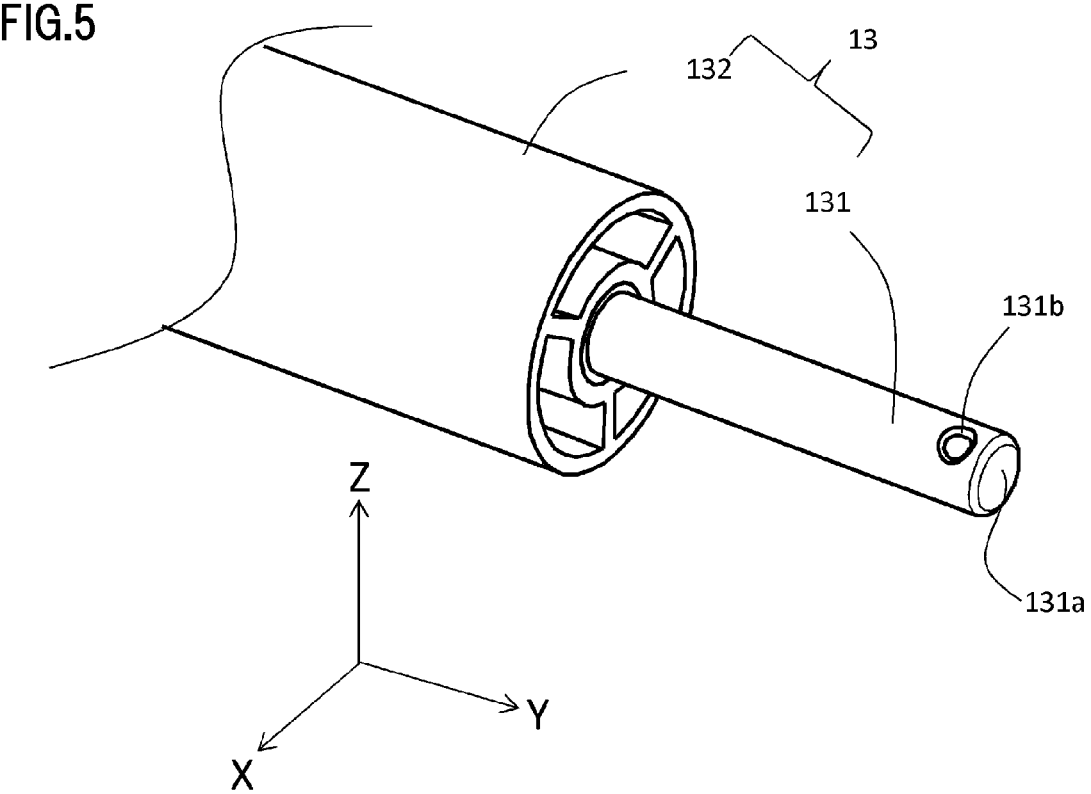

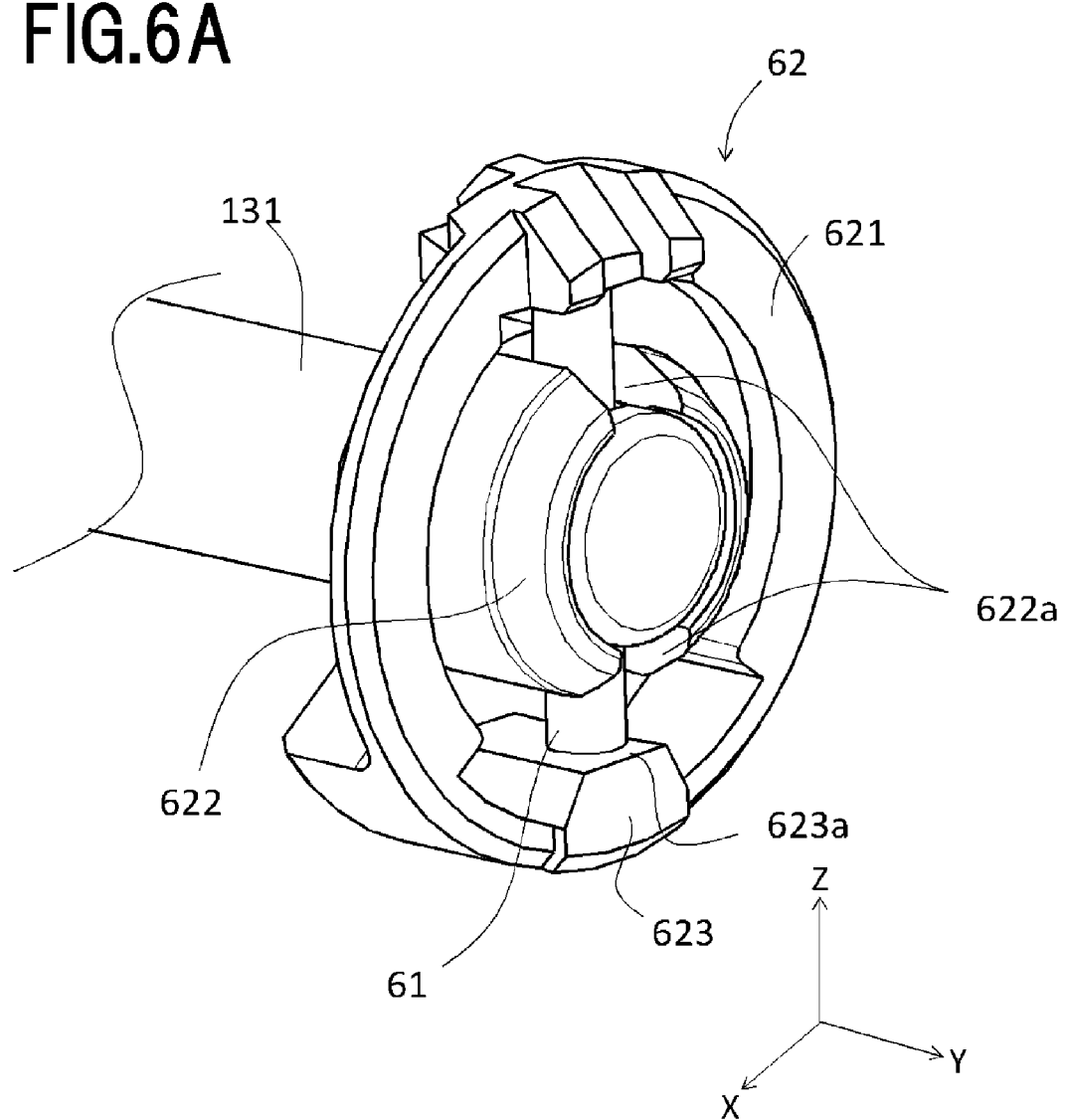

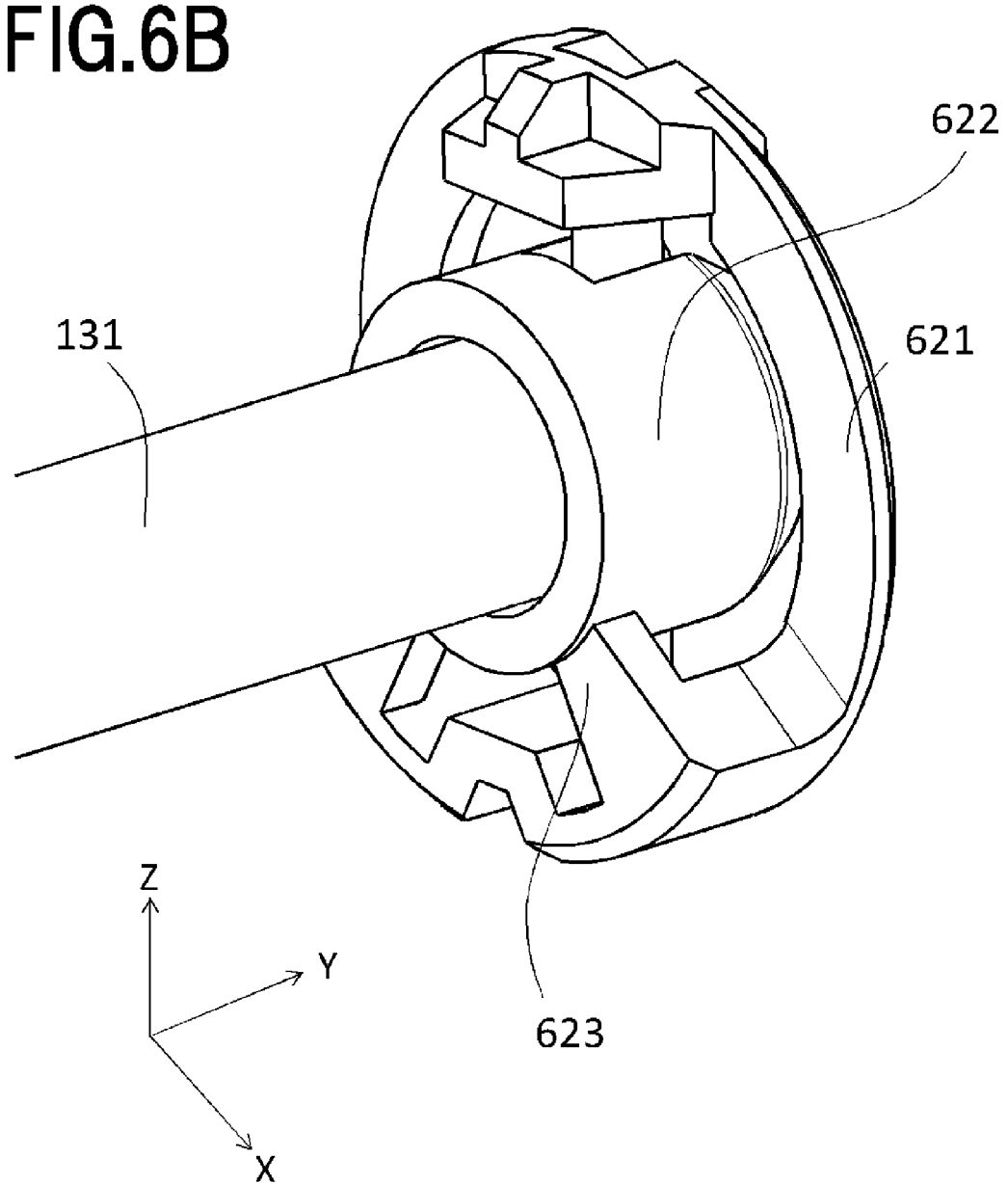

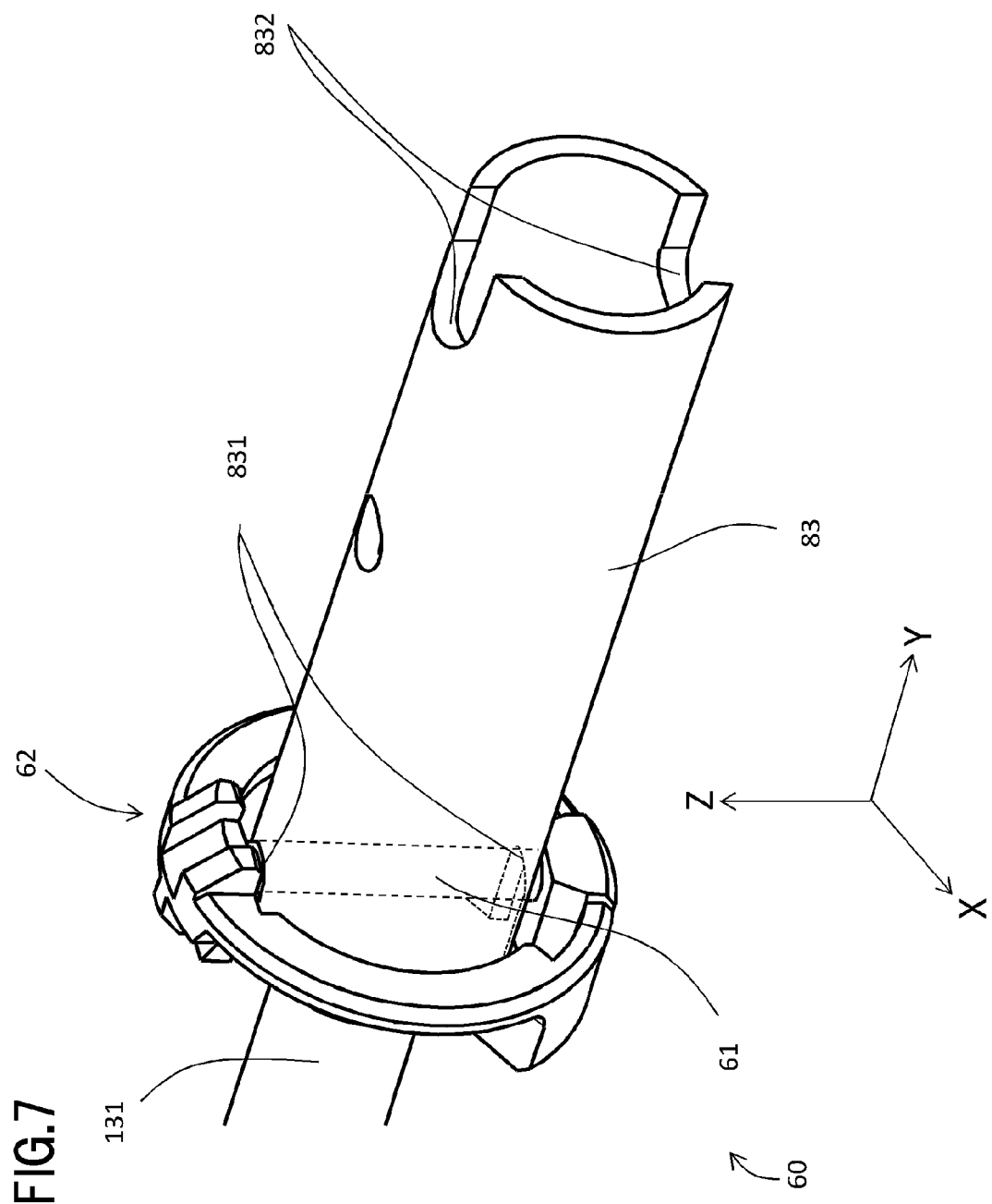

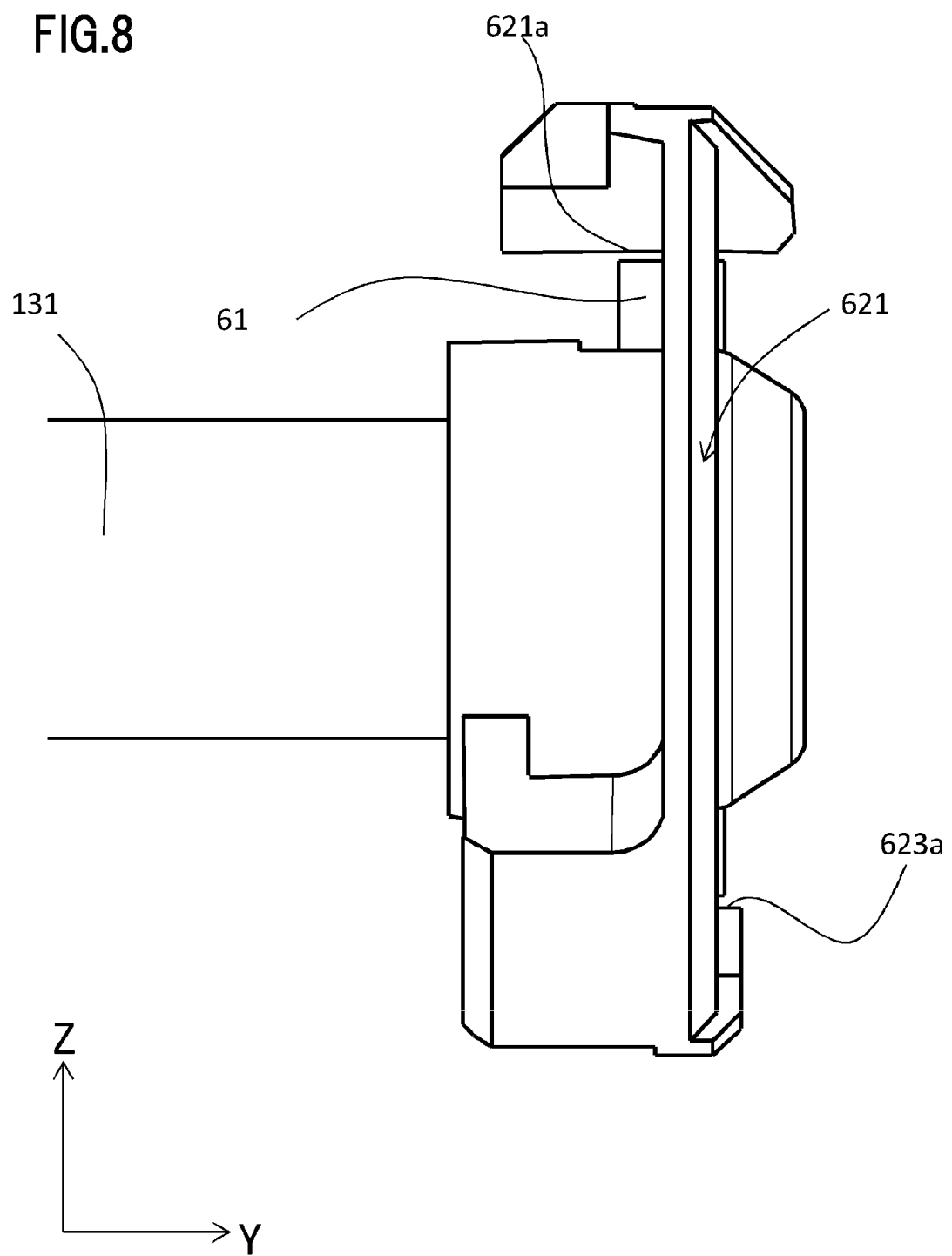

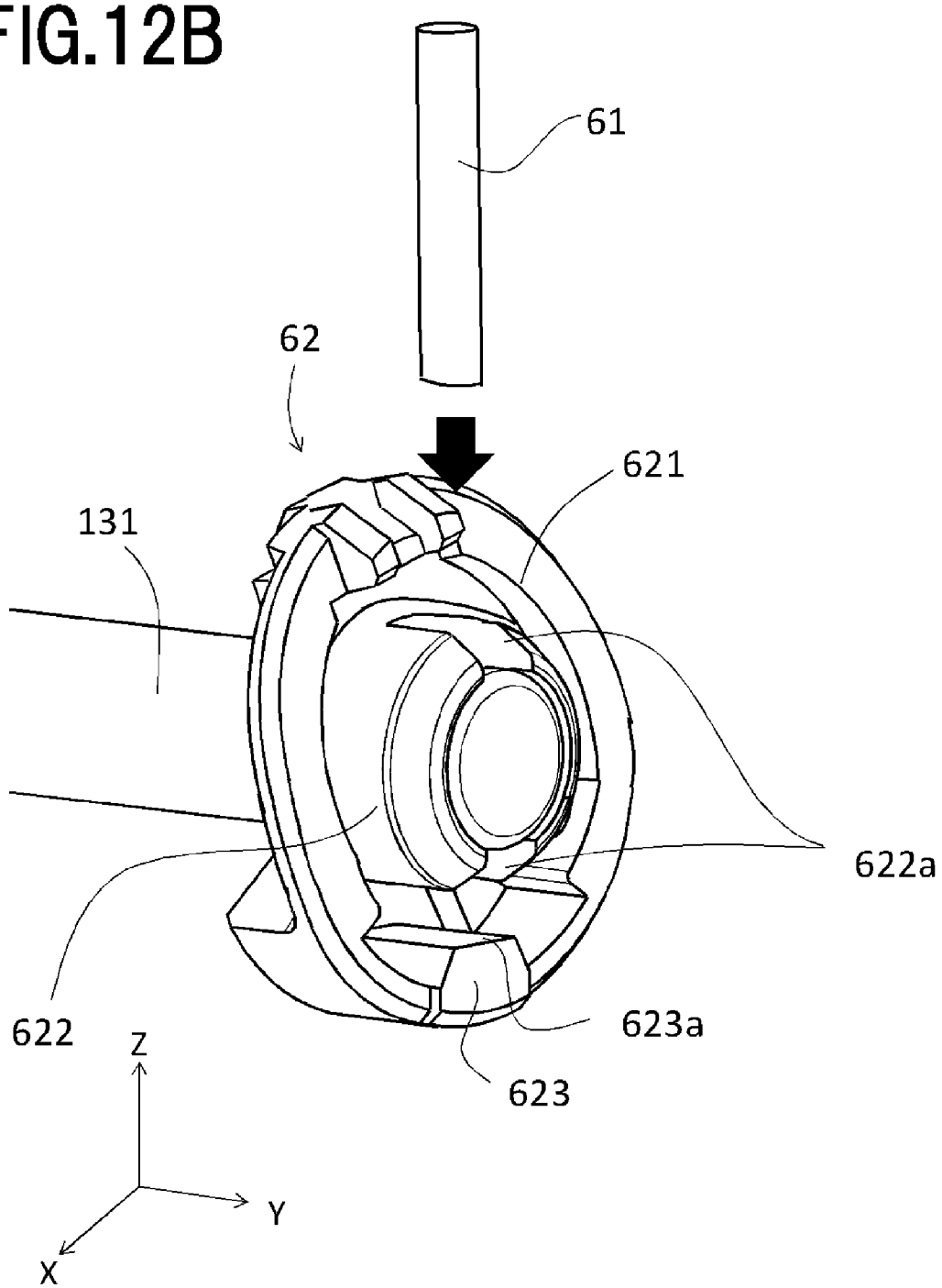

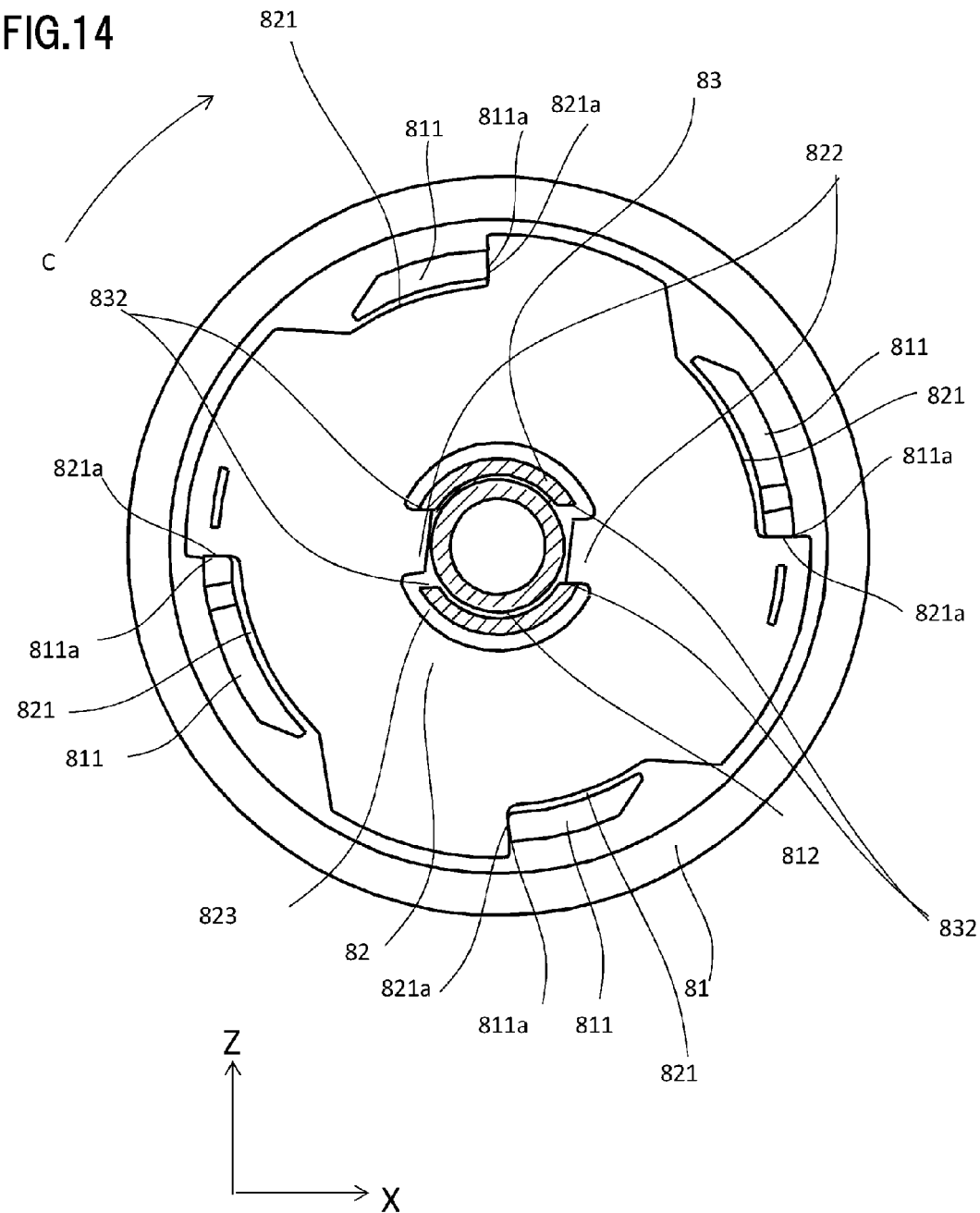

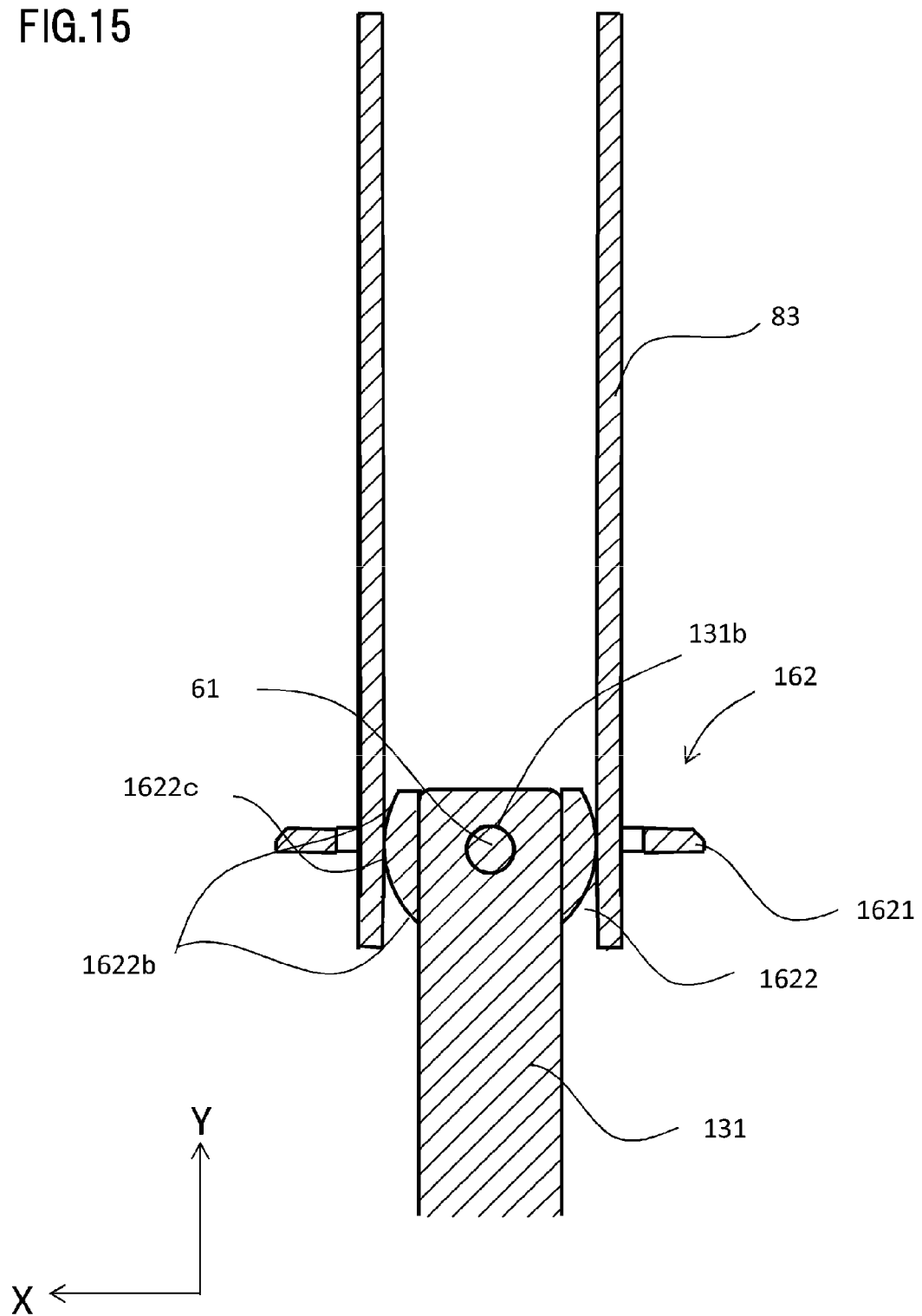

US 9,822,822 B2

DRIVE APPARATUS AND BELT UNIT FOR IMAGE FORMING APPARATUS

This application is a continuation of application Ser. No. 14/962,188, filed Dec. 8, 2015.

BACKGROUND OF THE INVENTION

Field of the Invention

The present invention relates to a drive apparatus and a belt unit for an image forming apparatus.

Description of the Related Art

In an image forming apparatus, such as a printer, a known mechanism for driving rollers, and so on, to rotate is a mechanism in which a pin (axle member) is attached to one of a driven-side shaft (rotary axle) and a drive-side shaft, while the other shaft without the pin engaging with the pin, and rotary drive power is transmitted via the pin. Japanese Patent Application Publication No. 2009-228824 discloses a drive power transmission mechanism provided with a pin fall preventing member, wherein sliding movement of the fall preventing member and the pin during rotation of the shaft is suppressed by a configuration using two pins.

In the configuration disclosed in Japanese Patent Application Publication No. 2009-228824, the shaft which engages with the pin is configured so as to engage directly with the pin and the other shaft, and it is difficult to adjust the alignment of the central axes of rotation between the two shafts. Furthermore, the fall preventing member only has a function of restricting the movement of the pin for transmitting drive power and preventing falling of the pin from the axle, and does not have a function for drive transmission. Therefore, if the central axes of rotation of the two shafts are not substantially aligned, then there is a problem in that accurate drive transmission is difficult to achieve.

SUMMARY OF THE INVENTION

The object of the present invention is to provide a drive apparatus and a belt unit enabling highly accurate transmission of rotary drive power between two rotary axles.

In order to achieve the object described above, the drive apparatus of the present invention is a drive apparatus comprising:

a first rotary member;

a second rotary member, which is provided with an axle hole, and which receives drive power from the first rotary member or transmits drive power to the first rotary member;

an axle member, which is inserted into the axle hole and engages with the first rotary member so as to transmit drive power between the first rotary member and the second rotary member; and a coupling member for coupling the first rotary member and the second rotary member;

wherein the coupling member is provided with a sliding portion which is disposed between the first rotary member and the second rotary member in a radial direction and which slides over either one of the first rotary member and the second rotary member when the first rotary member and the second rotary member rotate integrally with each other via the axle member.

In order to achieve the object described above, the belt unit of the present invention is a belt unit to which drive power is transmitted from a first rotary member provided in an image forming apparatus, the belt unit comprising:

an endless belt;

a second rotary member which enables rotary movement of the belt by receiving drive power from the first rotary member, and which includes an axle hole provided so as to be open in the circumferential surface of the second rotary member and so as to extend in a direction perpendicular to an axial line of the second rotary member;

an axle member, which is inserted into the axle hole and engages with the first rotary member so as to transmit drive power between the first rotary member and the second rotary member; and a coupling member which is disposed between the first rotary member and the second rotary member in a radial direction and serves to couple the first rotary member and the second rotary member;

wherein the coupling member includes a sliding portion which slides over either one of the first rotary member and the second rotary member when the first rotary member and the second rotary member rotate integrally with each other via the axle member, and a restricting portion which restricts departure of the axle member from the axle hole in the second rotary member.

Further features of the present invention will become apparent from the following description of exemplary embodiments (with reference to the attached drawings).

BRIEF DESCRIPTION OF THE DRAWINGS

FIG. 5 is a diagram showing one end of a shaft on which a roller-side coupling is provided;

FIGS. 6A and 6B are illustrative diagrams of the roller-side coupling;

FIG. 7 is a diagram showing engagement between the roller-side coupling and a pipe;

FIG. 8 is a side view diagram of the roller-side coupling;

FIGS. 12A and 12B are illustrative diagrams of an assembly method of the roller-side coupling;

FIG. 14 is a cross-sectional diagram of the drive-side coupling along BB in FIG. 13; and FIG. 15 is a cross-sectional diagram of a roller-side coupling according to a second embodiment.

DESCRIPTION OF THE EMBODIMENTS

Embodiments of the present invention will now be described in detail based on examples with reference to the drawings. The dimensions, materials, shapes and relative dispositions or the like of the components described in the embodiments may need to be appropriately changed depending on the configuration and various conditions of the apparatus to which the present invention is applied. In other words, the scope of the invention is not limited to the following embodiments.

First Embodiment

An image forming apparatus according to a first embodiment of the present invention is now described with reference to FIG. 1 to FIG. 14. Here, a full-color laser printer in which four process cartridges can be installed detachably is given as an example of an electrophotographic image forming apparatus (called "image forming apparatus" below) to which the drive power transmission mechanism of the present embodiment can be applied. The configuration of the image forming apparatus to which the drive power transmission mechanism of the present embodiment can be applied is not limited to the configuration given in this example. For instance, the drive power transmission mechanism can also be applied to a monochrome printer in which one process cartridge can be installed detachably, or to other image forming apparatuses, such as copying machines, facsimile machines, or composite device combining the functions of these, and the like.

(Image Forming Apparatus 1)

Figure 1:
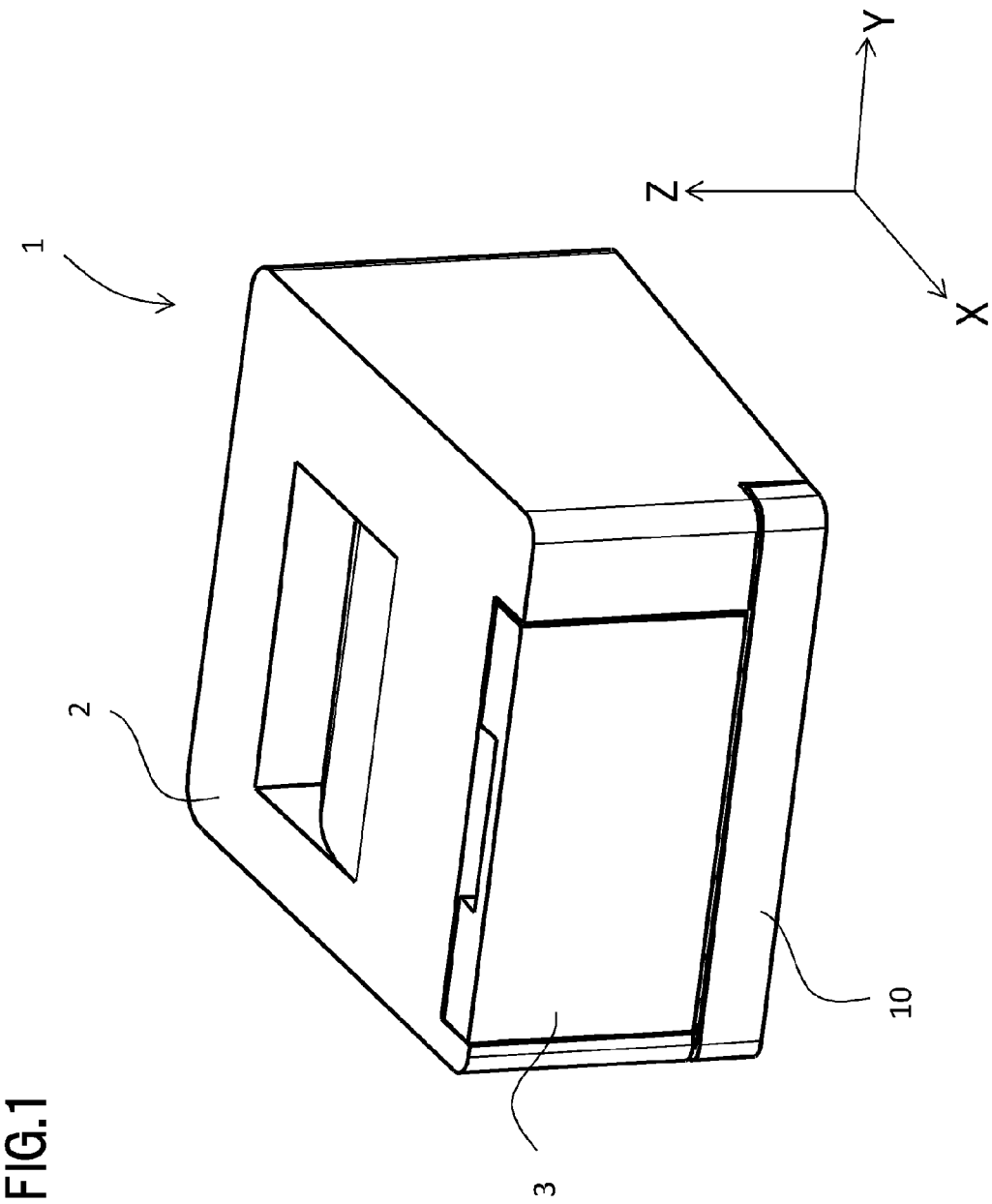
FIG. 1 is a perspective diagram showing one example of an electrophotographic image forming apparatus according to a first embodiment of the present invention.

FIG. 1 is an external perspective view of an image forming apparatus provided with a drive power transmission mechanism (drive apparatus) of the present embodiment.

Figure 2:
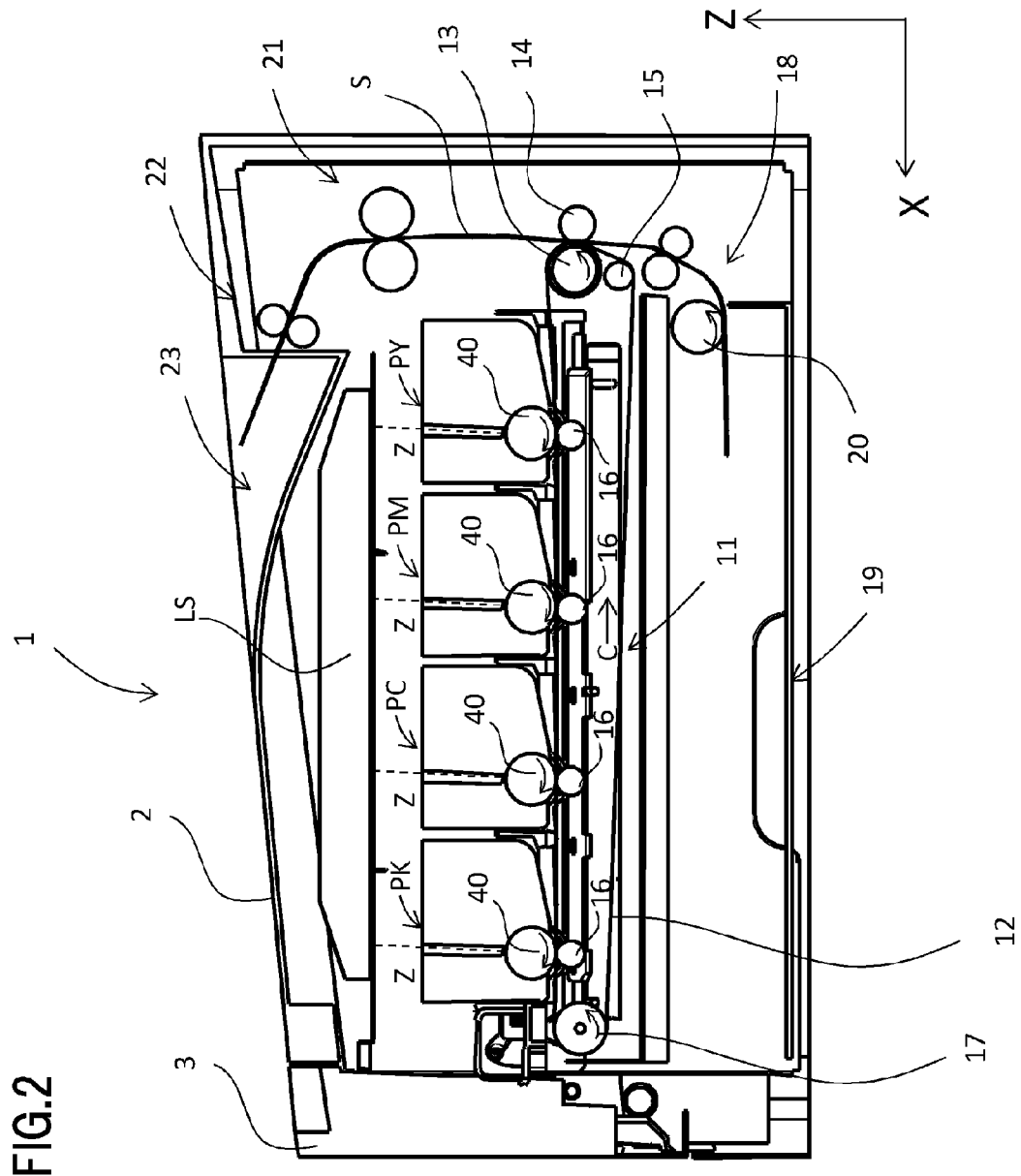
FIG. 2 is a schematic cross-sectional diagram showing one example of the electrophotographic image forming apparatus according to the first embodiment of the present invention.

FIG. 2 is a schematic cross-sectional diagram of an image forming apparatus provided with the drive power transmission mechanism of the present embodiment. The image forming apparatus 1 forms color images on a sheet S using an electrophotographic process. The image forming apparatus 1 employs a process cartridge system, and the process cartridge P (called "cartridge" below) is installed detachably in the apparatus main body 2. Here, in the image forming apparatus 1, the side where the device opening door 3 is provided is called the front surface, the surface on the opposite side to the front surface is called the rear surface, the right-hand side when the image forming apparatus 1 is viewed from the front surface is called the drive side and the left-hand side is called the driven side.

Four cartridges, a first cartridge PY, a second cartridge PM, a third cartridge PC and a fourth cartridge PK (PY/PM/PC/PK) are disposed in the horizontal direction (X direction) in the apparatus main body 2. The first to fourth cartridges P (PY/PM/PC/PK) each have a similar electrophotographic process mechanism, although the color of the developer (called "toner" below) is different in each case. The first to fourth cartridges P (PY/PM/PC/PK) receives the transmission of rotary drive power from a cartridge drive transmission section (not illustrated) of the apparatus main body 2.

Furthermore, a bias voltage (charging bias, developing bias, etc.) is supplied from the apparatus main body 2 to the first to fourth cartridges P (PY/PM/PC/PK). The first cartridge PY accommodates yellow (Y) toner and forms a yellow toner image on the surface of the photosensitive drum 40. The second cartridge PM accommodates magenta (M) toner and forms a magenta toner image on the surface of the photosensitive drum 40. The third cartridge PC accommodates cyan (C) toner and forms a cyan toner image on the surface of the photosensitive drum 40. The fourth cartridge PK accommodates black (K) toner and forms a black toner image on the surface of the photosensitive drum 40.

A laser scanner unit LS serving as light exposure means is provided above the first to forth cartridges P (PY/PM/PC/PK). This laser scanner unit LS outputs laser light Z in accordance with image information. The laser light Z performs a scanning exposure over the surface of the photosensitive drum 40, by passing through an exposure window portion in the cartridge P.

An intermediate transfer belt unit 11 as a transfer member is provided below the first to forth cartridges P (PY/PM/PC/PK). The intermediate transfer belt unit 11 has a drive roller 13, a tension roller 17 and an assist roller 15 as rotating members, and a transfer belt 12 which is flexible is wrapped about these rollers. The transfer belt 12 is driven to rotate in the direction of arrow C by the drive roller 13. Rotary drive power is transmitted to the drive roller 13 from a belt drive transmission section 50 (described below) of the apparatus main body 2.

The lower surface of each of the photosensitive drums 40 of the first to fourth cartridges P (PY/PM/PC/PK) makes contact with the upper surface of the transfer belt 12. This contact portion is a primary transfer portion. A primary transfer roller 16 is provided on the inner side of the transfer belt 12 so as to oppose the photosensitive drum 40. The secondary transfer roller 14 is made to contact the drive roller 13 via the transfer belt 12. The contact portion between the transfer belt 12 and the secondary transfer roller 14 is a secondary transfer portion.

A feed unit 18 is provided below the intermediate transfer belt unit 11. This feed unit 18 has a paper feed cassette 19 which accommodates sheets (recording material) S in a stacked fashion, and a sheet feed roller 20. The paper feed cassette 19 can be pulled out from the apparatus by opening the cassette cover 10. A fixing unit 21 and an output unit 22 are provided on the upper left side of the interior of the apparatus main body 2 in FIG. 2. The upper surface of the apparatus main body 2 forms an output tray 23. The toner image is fixed to the sheet S by fixing means provided in the fixing unit 21, and the sheet S is output to the output tray 23.

Figure 3:
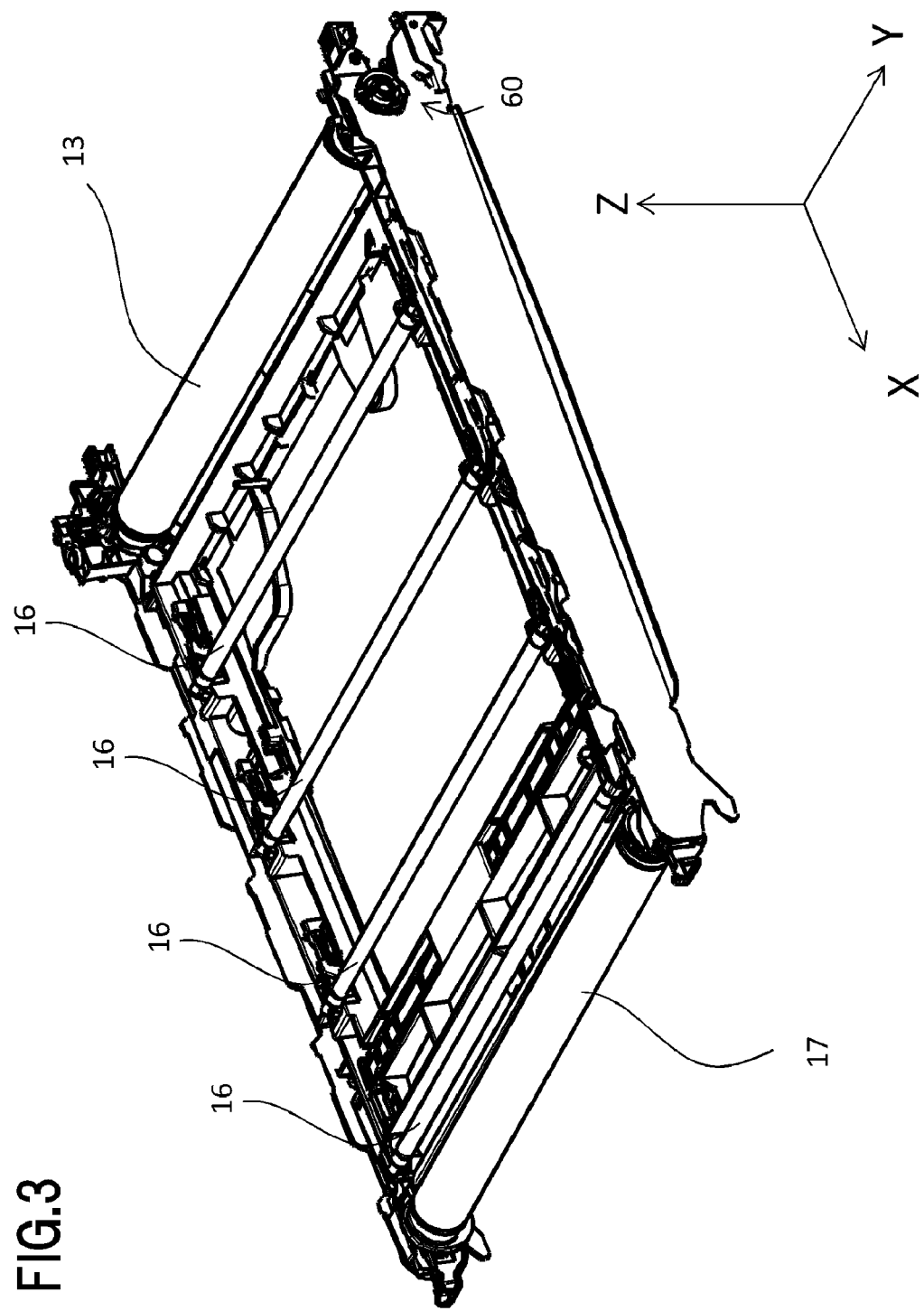
FIG. 3 is a perspective diagram showing one example of an intermediate transfer belt unit according to the first embodiment of the present invention.

FIG. 3 is a perspective diagram showing one example of the configuration of the intermediate transfer belt unit 11. In the present diagram, the transfer belt 12 is not depicted. A roller-side coupling 60 which constitutes a belt drive transmission section 50 is provided at one end of the drive roller 13.

(Belt Drive Transmission Section 50)

Figure 4:
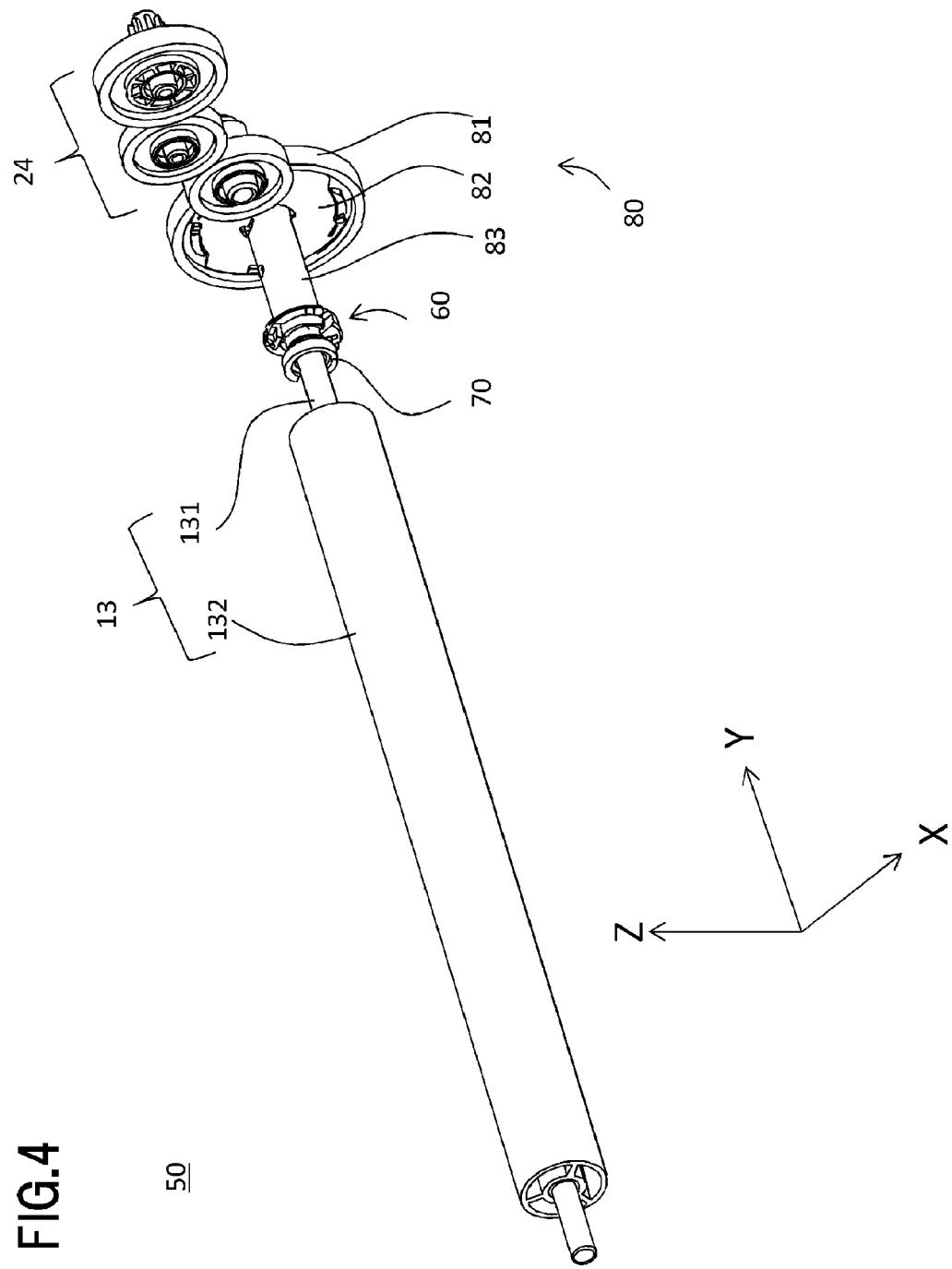
FIG. 4 is a perspective diagram showing a drive roller as viewed from the front surface of an apparatus main body.

FIG. 4 is a perspective diagram showing the drive roller 13 as viewed from the front surface side of the apparatus main body 2. The belt drive transmission section 50 in the present embodiment is constituted by a roller-side coupling 60 provided on the drive roller 13, a bearing 70, and a drive-side coupling 80 (described below) which is provided on the side of a drive source (not illustrated) and which rotates due to receiving drive power from the drive source (motor, etc.). In the present embodiment, the side where the drive-side coupling 80 is disposed is treated as a transmission portion which transmits drive power and the side where the roller-side coupling 60 is disposed is treated as a receiving portion which receives drive power. The rotating members in the present invention are not limited only to the various types of rollers described above, and a configuration may also be included in which rotary drive power is transmitted from a power source, such as a motor, inside an apparatus, such as a photosensitive drum 40, thereby driving the drum to rotate.

Here, the drive-side coupling 80 is configured by a drive transmission gear 81, a drive transmission plate 82 and a pipe 83. Although the details are described hereinafter, the drive power from the drive source is transmitted successively to the drive transmission gear 81, the drive transmission plate 82 and the pipe 83. A drive transmission mechanism 24 is provided from the drive source to the drive transmission gear 81.

Although described in detail below, the roller-side coupling 60 is configured so as to engage with the pipe 83, and the drive power of the pipe 83 is transmitted to the roller-side coupling 60. Here, the drive roller 13 is provided with a shaft 131 formed in a round cylindrical shape (one example of a rotary axle), and a contact portion 132 which is formed in a cylindrical shape on the outer circumferential surface side of the shaft 131 and which is disposed in contact with the inner circumferential surface of the transfer belt 12. The roller-side coupling 60 is disposed on one end of the shaft 131 and transfers drive power from the drive source, to the shaft 131.

Furthermore, in the present embodiment, the bearing 70 is provided inside a separate member (not illustrated) in the intermediate transfer belt unit 11. The circular ring-shaped bearing 70 is provided above the shaft 131, and the bearing 70 restricts the movement of the roller-side coupling 60 in the Y direction, in the direction opposite to the facing direction of the end surface 131a of the shaft 131.

FIG. 5 shows one end of the shaft 131 (one rotary axle) on which the roller-side coupling 60 is provided. As shown in FIG. 5, the shaft 131 is provided with a through hole 131b which passes through the shaft 131 (an axle hole provided in one rotary shaft), in a direction perpendicular to the axial line (rotational axis) of the shaft 131. FIG. 5 shows one of the two opening portions of the through hole 131b which are opened in the circumferential surface of the shaft 131.

FIGS. 6A and 6B are perspective diagrams illustrating the configuration of the roller-side coupling 60, wherein FIG. 6A is a view from one side in the Y direction (the axial direction of the shaft 131) and FIG. 6B is a view from the other side in the Y direction. The roller-side coupling 60 in the present embodiment is provided with a pin 61 (axle member) which is inserted into the shaft 131, and a resin cover member 62 (coupling member) which is supported on the shaft 131. Furthermore, although not shown in FIGS. 6A and 6B, a bearing 70 is provided (see FIG. 4).

Here, the pin 61, which is an example of a passing member and an insertion member, is formed in a round cylindrical shape, and is formed to be smaller than the internal diameter of the through hole 131b formed in the shaft 131. As shown in FIG. 6, the pin 61 is inserted into (passed through) the through hole 131b, and is arranged such that both end portions thereof project from the outer circumferential surface of the shaft 131. In the present embodiment, as described above, the outer diameter of the pin 61 is formed to be smaller than the inner diameter of the through hole 131b. Therefore, in the present embodiment, the pin 61 is installed on the shaft 131 in a non-indented state. As a result of this, it is possible to suppress flexing and/or deformation, etc. of the drive roller 13 due to indentation of the pin 61.

FIG. 7 is a perspective diagram showing a state where the roller-side coupling 60 is engaged with the pipe 83 (other rotary shaft). The pin 61 is configured so as to engage with the pipe 83. Two first pipe recess grooves 831 provided in the pipe 83 are disposed so as to engage with the pin 61, and drive power is transmitted from the pipe 83 to the pin 61. Therefore, the outer diameter of the pin 61 is configured so as to be smaller than the width of the first pipe recess grooves 831. The pin 61 is inserted into the through hole 131b of the shaft 131 and the shaft 131 (drive roller 13) rotates due to drive transmission to the pin 61. The shaft 131 and the pipe 83 constitute a drive apparatus, as a first rotary member or a second rotary member.

Meanwhile, in FIG. 6, the cover member 62, which is one example of a fall preventing member and a centering/swinging member for a counterpart member, is formed in a substantially dual-ring shape. The cover member 62 functions as a coupling member. The cover member 62 is provided with an outer ring portion 621 (second ring portion), an inner ring portion 622 (first ring portion), and a base portion 623 (coupling portion) which connects the outer ring and the inner ring. The centers of the circumferences of the outer ring portion 621 and the inner ring portion 622 are matching. A first fall preventing portion 623a (retaining portion) is provided on the inner circumferential surface of the outer ring of the base portion 623. Furthermore, a second fall preventing portion 621a is provided on the outer ring portion 621 at a position opposing the first fall preventing portion 623a via the center of the ring (See FIG. 8). A restricting portion is configured by the first fall preventing portion 623a and the second fall preventing portion 621a.

Recess grooves 622a are formed in the inner ring portion 622 as engagement portions which are capable of engaging with the pin 61 (axle member) in the direction of rotation, at two positions which are mutually opposing via the center of the inner ring.

The first fall preventing portion 623a and the second fall preventing portion 621a are disposed so as to oppose both ends of the pin 61. More specifically, the pin 61 is disposed so that both sides thereof in the axial direction are sandwiched between the first fall preventing portion 623a and the second fall preventing portion 621a. Therefore, even if the pin 61 slides inside the through hole 131b, this sliding is limited (restricted) due to the contact between the first fall preventing portion 623a and the second fall preventing portion 621a. Consequently, the pin 61 is prevented from falling out from the through hole 131b (shaft 131) by the first fall preventing portion 623a and the second fall preventing portion 621a. Here, the cover member 62 can be treated as a restricting member which restricts sliding of the pin 61 within a prescribed range.

FIG. 8 is a side view diagram of a roller-side coupling 60. A configuration is adopted wherein the Y-direction position of the first fall preventing portion 623a and the second fall preventing portion 621a which restrict sliding of the pin 61 matches the Y-direction position of the outer ring portion 621. As a result of this, even if the pin 61 receives a force and moves in the Z direction, and makes contact with the first fall preventing portion 623a or the second fall preventing portion 621a, thereby generating a force in the Z direction, no force is generated to deform the outer ring portion 621 in the Y direction. Therefore, it is possible to prevent falling out of the pin 61, even if a force is applied to the pin 61.

Figure 9:
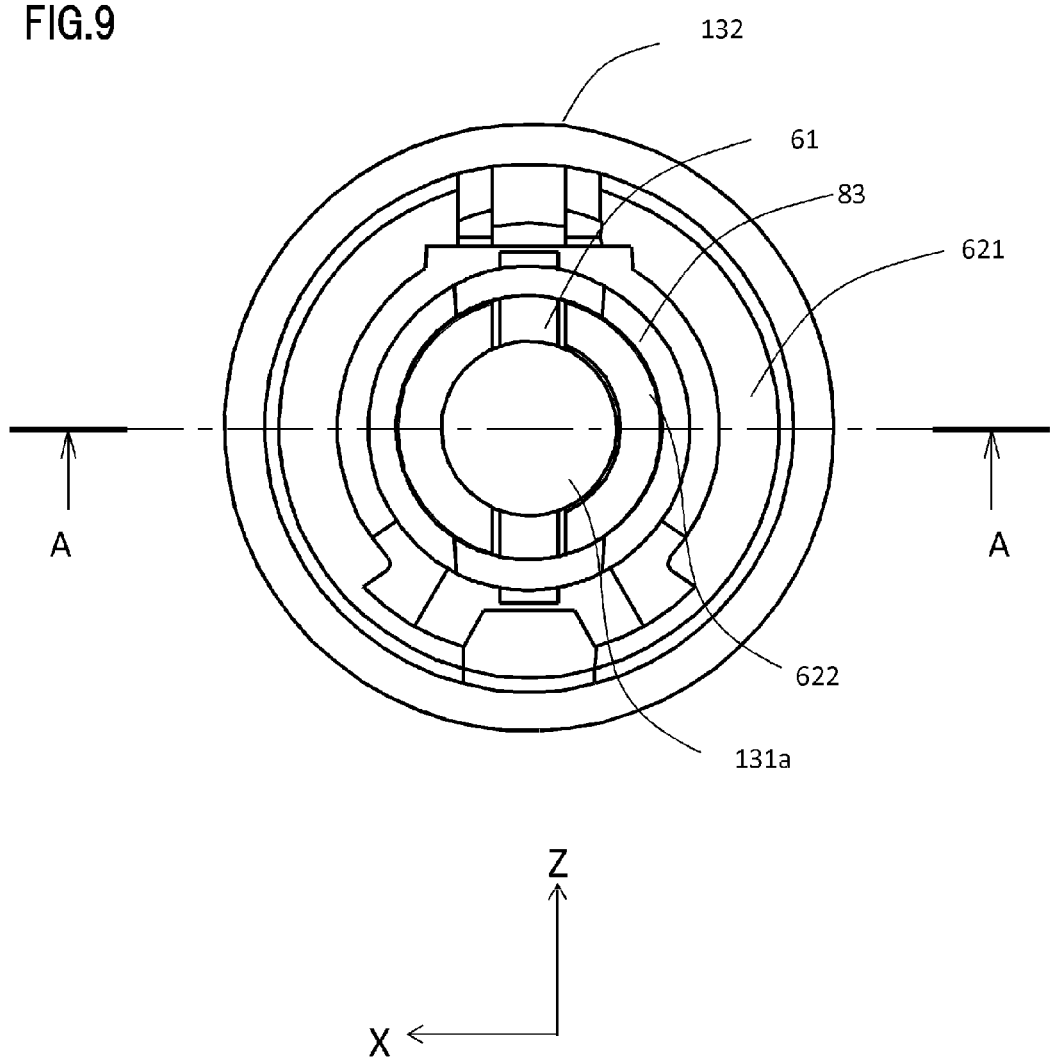
FIG. 9 is an illustrative diagram of the roller-side coupling.

FIG. 9 is a front view diagram of the roller-side coupling 60. The cover member 62 is installed on the pipe 83 by fitting the outer circumferential surface of the inner ring portion 622, which forms an internal fitting portion, in contact with the inner circumferential surface of the pipe 83. Consequently, the central axis of the inner ring portion 622 of the cover member 62 and the central axis of the pipe 83 can be matched to each other. The counterpart member on which the cover member 62 is installed is not limited to being a round cylindrical member having an axle hole which is open at both end surfaces in the manner of the pipe 83, and may also be a rotary axle having an axle hole which is open at only one end surface.

Figure 10A:
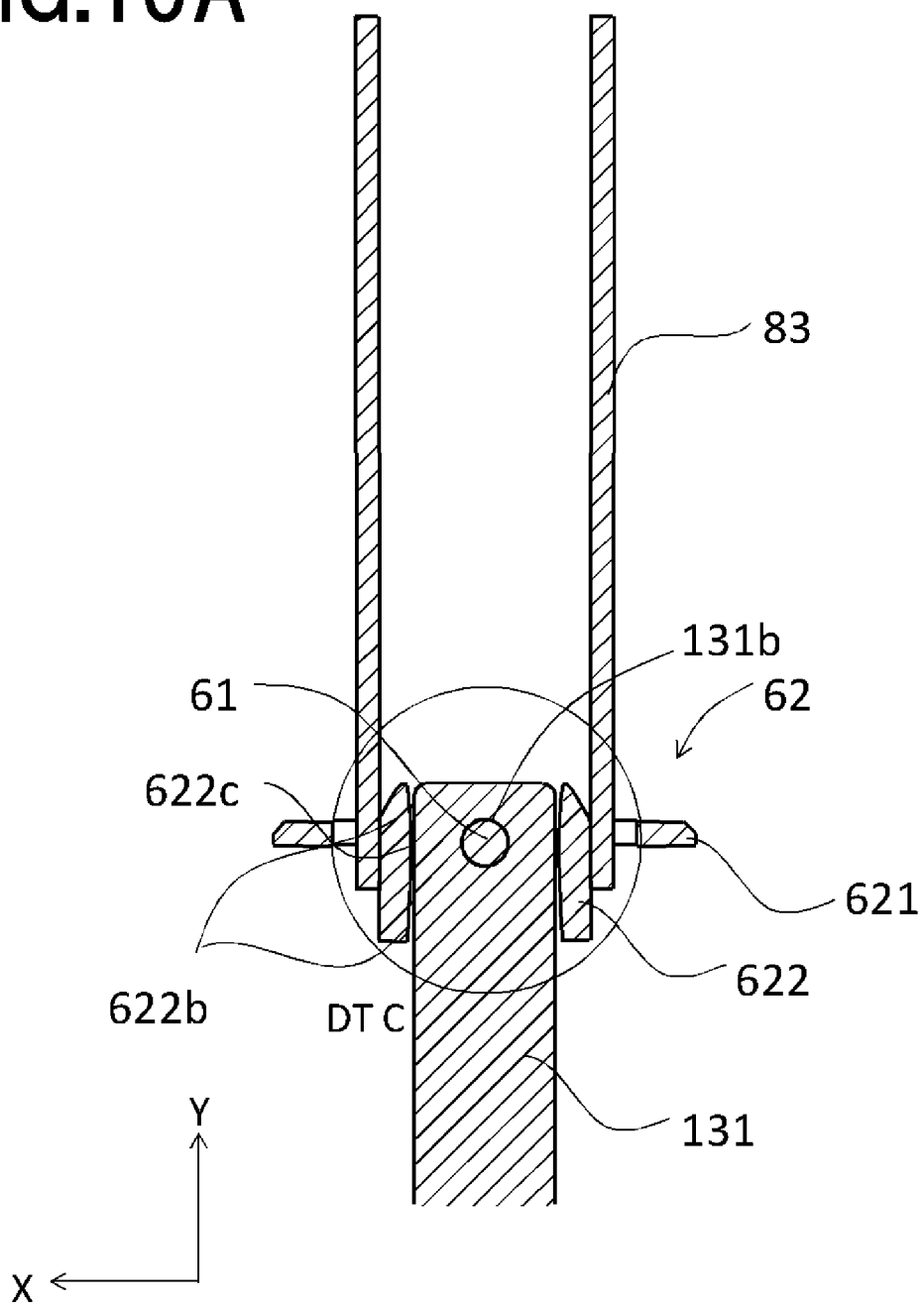
FIGS. 10A and 10B are cross-sectional diagrams of the roller-side coupling along AA in FIG. 9.
Figure 10B:
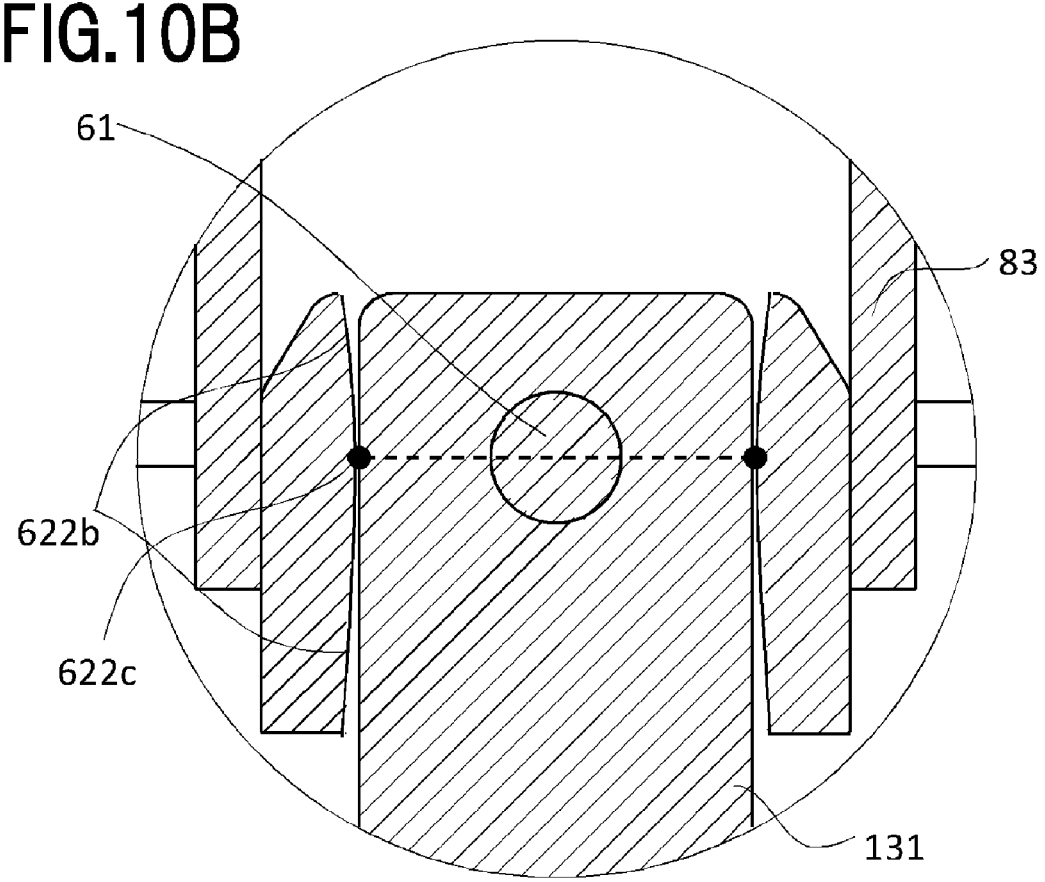

FIG. 10A is a cross-sectional diagram along AA in FIG. 9 and FIG. 10B is an enlarged diagram of the inner ring portion 622 of the cover member 62 in FIG. 10A. As shown in FIGS. 10A and 10B, the inner circumferential surface of the inner ring portion 622 of the cover member 62 is configured in a convex shape in the inner radial direction, and clearance portions 622b are provided about the entire circumference of both end portions, in the Y direction, of the inner circumferential surface. The clearance portions 622b are configured so as not to contact the shaft 131 of the drive roller 13, when in a load-less state. On the other hand, a swing accommodating portion 622c is formed in the portion of the inner circumferential surface of the inner ring portion 622 apart from both end portions in the Y direction. The swing accommodating portion 622c is configured so as to have a smaller diameter than the clearance portions 622b, and the clearance between the cover member 62 and the shaft 131 is desirably the minimum distance that permits swinging between the cover member 62 and the shaft 131. Furthermore, if the cover member 62 is flexible, then no problem arises even if there is no clearance between the swing accommodating portion 622c and the shaft 131, since a swinging movement is still possible between the cover member 62 and the shaft 131. Moreover, the position in the Y direction of the through hole 131b of the shaft 131 and the pin 61 is arranged so as to substantially match the swing accommodating portion 622c in the Y direction.

In other words, the inner circumference of the inner ring portion 622 of the cover member 62 is formed in such a manner that the cross-sectional shape thereof (inner circumference outline shape) in a plane containing the central axis of the inner ring portion 622 (which coincides with the central axis of the pipe 83) is formed in a convex arc shape (curved surface portion) towards the circumferential surface of the shaft 131. The apex of the curved surface having this arc-shaped cross-section forms the swing accommodating portion 622c, and as indicated by the dotted line in FIG. 10B, creates a ring-shaped (linear) contact portion on the circumferential surface of the shaft 131. By forming a contact portion of this kind, even if divergence occurs in the alignment of the shaft 131 and the pipe 83 in terms of the lengthwise central axes, the cover member 62 is able to rotate about the pin 61 and drive transmission can be performed.

Figure 11:
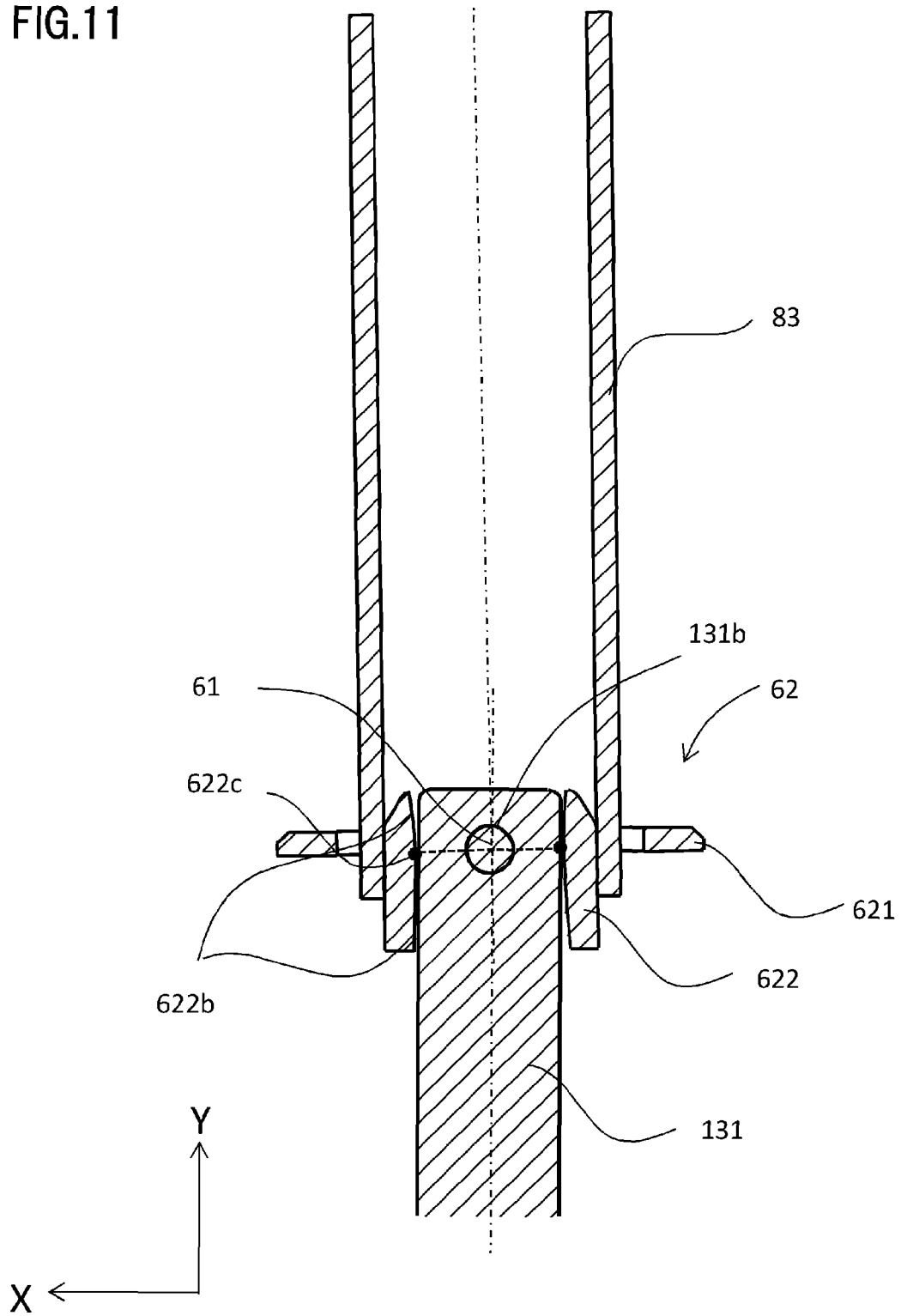
FIG. 11 is a diagram showing a state of swinging of the roller-side coupling.

FIG. 11 shows a cross-section along A-A in FIG. 9 of a case where divergence of alignment has occurred between the lengthwise central axes of the shaft 131 and the pipe 83. As shown in FIG. 11, when an angle occurs between the axial line of the shaft 131 and the axial line of the pipe 83, the ring-shaped contact portion (swing accommodating portion 622c) of the inner ring portion 622 also becomes inclined with respect to the axial line of the shaft 131, in accordance with the size of the angle. In other words, it is possible to treat the cover member 62 as having a swinging mechanism between the pipe 83 and the shaft 131. Since the cover member 62 is fixed concentrically with the pipe 83, then the ring-shaped contact portion of the inner ring portion 622 produces an angle corresponding to the inclination between the axial line of the pipe 83 and the axial line of the shaft 131.

Due to the curved surface portion where the ring-shaped contact portion of this kind is formed, the inner ring portion 622 slidably contacts the outer circumferential surface of the shaft 131 and is able to transmit the rotary drive power of the pipe 83 to the shaft 131. More specifically, when an inclined state such as that described above occurs, the ring-shaped contact portion of the inner ring portion 622, as a sliding portion, upon rotation of the pipe 83, rotates about an axis of rotation that matches the axial line of the shaft 131, while sliding over the outer circumferential surface of the shaft 131. Focusing on one point in the contact portion of the inner ring portion 622, this sliding movement involves the aforementioned one point moving over the outer circumferential surface of the shaft 131 in the axial direction of the shaft 131 while rotating about the axial line of the shaft 131, in accordance with the rotation of the pipe 83 and the shaft 131. When a speed difference occurs between the pipe 83 and the shaft 131, the point moves relatively with respect to the shaft 131 in the direction of rotation as well. The movement of the point in the axial line direction of the shaft 131 is a cyclical reciprocal movement. The size of the range (amplitude) of the reciprocal movement changes in accordance with the size of the angle between the axial line of the shaft 131 and the axial line of the pipe 83, and becomes greater as the angle increases.

By adopting a sliding configuration of this kind, the force seeking to shift the central axis of rotation of the shaft 131, in the force that is transmitted from the pipe 83 to the shaft 131, is absorbed by the sliding movement between the cover member 62 and the shaft 131, and only the rotary force is transmitted to the pin 61. Consequently, the shaft 131 can continue to rotate while maintaining the axis of rotation thereof. In other words, even if a divergence in the central axis (axial line) occurs between the pipe 83 and the shaft 131, the rotary drive power of the pipe 83 can be transmitted to the shaft 131 and highly accurate drive transmission can be achieved. The range of swinging movement is restricted by contact between the clearance portions 622b of the cover member 62 and the surface of the shaft 131. Furthermore, in the present embodiment, the clearance portions 622b are provided about the whole circumference of the end portions of the inner circumferential surface of the inner ring portion 622, but the clearance portions 622b do not have to be provided about the whole circumference, provided that they do not impede the swinging movement of the cover member 62 about the pin 61.

As shown in FIG. 10, in a state where no angle occurs between the axial line of the shaft 131 and the axial line of the pipe 83, in other words, a state where both axial lines are matched, then basically, no sliding movement occurs between the inner ring portion 622 and the outer circumferential surface of the shaft 131. In other words, the rotary drive power of the pipe 83 is transmitted directly to the shaft 131 via the pin 61.

Figure 12A:
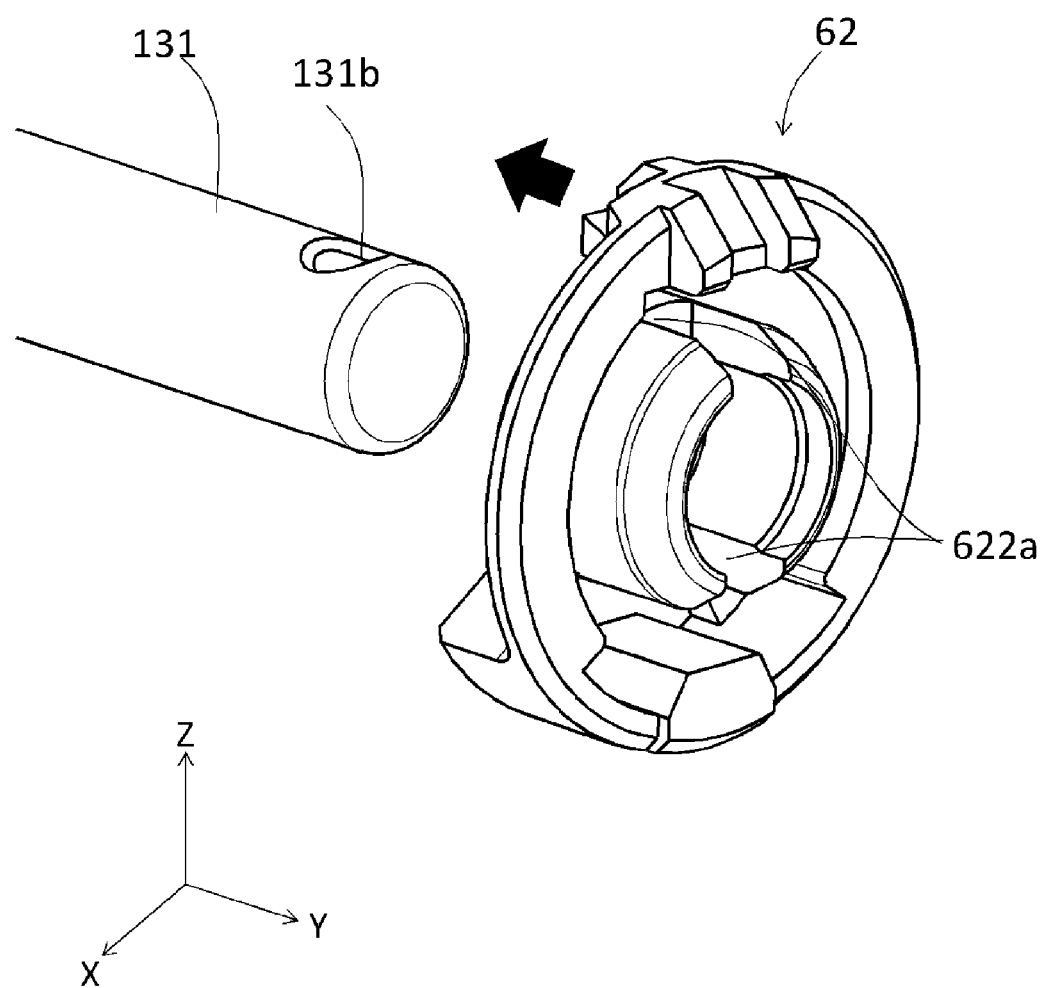

(Method for installation of cover member 62 on shaft 131)
FIG. 12 is a diagram for describing the method of installation of the cover member 62. It is supposed that the bearing 70 has previously been inserted into the shaft 131 of the drive roller 13. In the present embodiment, as shown in FIG. 12A, firstly, the cover member 62 is laid over the shaft 131 of the drive roller 13. The recess grooves 622a in the cover member 62 and the through hole 131b in the shaft 131 are disposed so as to be substantially matching (mutually overlapping) in the radial direction with respect to the central axis of the shaft 131.

Thereupon, as shown in FIG. 12B, a load is applied to the outer ring portion 621 of the cover member 62, thereby causing the outer ring portion 621 to flex about X axle with the base portion 623 as a fulcrum. Therefore, the outer ring portion 621 is made from a material that can be caused to flex by an operator. It is necessary to guarantee an amount of flexure whereby a state is reached in which, at the least, the whole of the through hole 131b of the shaft 131 is not covered by the outer ring portion 621, as viewed in the Z direction. Furthermore, when flexing the outer ring portion 621, it is possible to deform the ring portion with a smaller force by applying force to a portion that is distant from the base portion 623 thereof.

Next, the pin 61 is inserted into the through hole 131*b* while the outer ring portion 621 is in a flexed state. The end of the pin 61 abuts against the first fall preventing portion 623*a*, thereby restricting the insertion position thereof. After insertion of the pin 61, the outer ring portion 621 is set to a load-less state, and the outer ring portion 621 returns to its original shape. The material selected for the outer ring portion 621 is one having a restoring force whereby, when the load is released, the shape of the outer ring portion 621 that has been flexed substantially matches the shape before the application of the load. It is also possible to adopt a configuration wherein the base portion 623 is made flexible, and the outer ring portion 621 can deform and be displaced relative to the inner ring portion 622, in such a manner that the pin 61 can inserted into the through hole 131*b*.

When inserting the pin 61 as described above, it is possible for the cover member 62, the pin 61 and the shaft 131 to rotate in a mutually coordinated fashion. Consequently, sliding movement is suppressed at the contacting surfaces between the inner circumferential surface of the inner ring portion 622 of the cover member 62 and the surface of the shaft 131, and between the end of the pin 61 and the first fall preventing portion 623*a* and the second fall preventing portion 621*a* of the cover member 62. Moreover, Y-direction movement of the cover member 62 in the same direction as the end surface 131*a* of the shaft 131 is restricted by contact between the pin 61 and the recess grooves 622*a* in the cover member 62. In other words, the pin 61 can be treated as a one-way retainer for the cover member 62 in one of Y directions. Furthermore, according to the installation method described above, after placing the cover member 62 on the shaft 131, there is no need to move the cover member 62 in the Y direction when inserting the pin 61. Consequently, there is no requirement to allow space for Y-direction movement of the cover member 62 on the shaft 131, and the space on the shaft 131 can be utilized more effectively.

(Characteristics of Cover Member 62)

In the present configuration, the cover member 62 is separated into an inner ring and an outer ring. Drive power is transmitted by engagement of the pipe 83 and the pin 61 exposed between the inner ring portion 622 and the outer ring portion 621 of the cover member 62. Furthermore, the pin 61 serves as a one-way retainer for the cover member 62 in one of Y directions, due to contact in the Y direction between the pin 61 and the recess grooves 622*a* of the cover member 62. Moreover, since the phase, in the direction of rotation, of the recess grooves 622*a* in the cover member 62 and the through hole 131*b* of the shaft 131 is restricted by the pin 61, then sliding movement between the cover member 62, the shaft 131 and the pin 61 is suppressed.

As described above, it is possible to impart three functions to the pin 61, namely, transmission of drive power, retaining of the cover member 62 and suppression of sliding. In a conventional configuration, the pin used for transmission of drive power and the pin used for retaining the cover member and for coordinated rotation (suppressing sliding movement) with the axle include two components, but according to the configuration of the present embodiment, it is possible to reduce the number of components by using a common pin for both components.

(Drive-Side Coupling 80)

Figure 13:
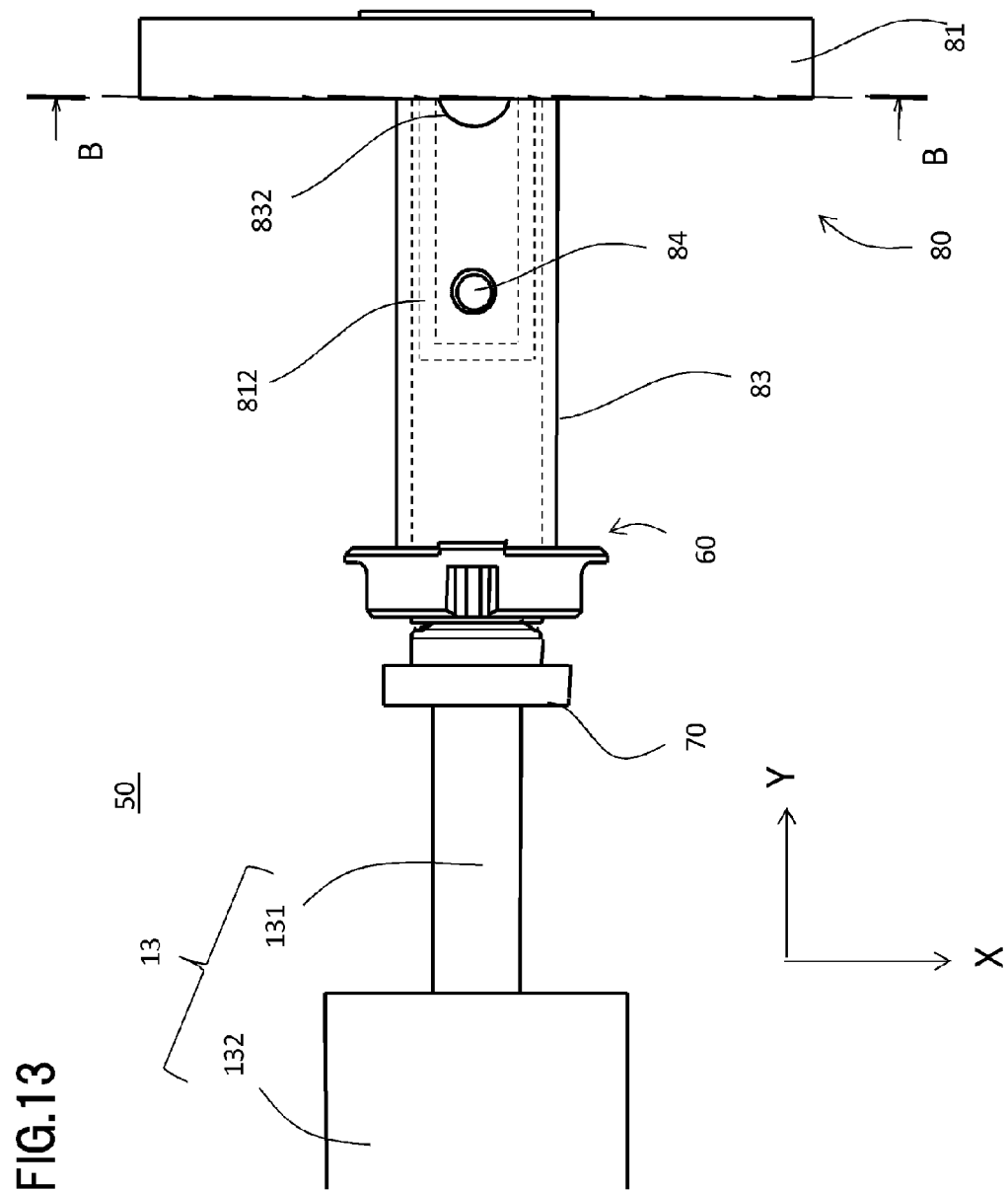
FIG. 13 is a diagram showing a configuration of a belt drive transmission section.

FIG. 13 is a diagram showing the configuration of the belt drive transmission section 50 as viewed from the upper surface in the Z direction. As stated previously, the drive-side coupling 80 is provided at the drive source (not illustrated) side inside the belt drive transmission section 50. FIG. 14 is a cross-sectional diagram along BB in FIG. 13.

The drive power from the drive source is transmitted successively to the drive transmission gear 81, the drive transmission plate 82 and the pipe 83. Here, one or a plurality of projecting portions 811 are provided on the side surface portion of the drive transmission gear 81, on the same circumferential line at a prescribed distance from the center of the pitch circle of the gear. A drive transmission surface 811*a* is provided in the projecting portion 811 on the front side in terms of the direction of rotation C of the drive transmission gear 81. Moreover, a central projecting portion 812 is provided in the center of rotation of the side surface of the drive transmission gear 81. Furthermore, the axial direction positions of the pipe 83 and the drive transmission gear 81 are restricted by a stopper 84 (which fits into a through hole provided in the circumferential surface of the pipe 83).

On the other hand, the drive transmission plate 82 is of a circular plate shape in which one or a plurality of cutaways 821 is provided in the outermost circumferential surface thereof. The cutaways 821 are configured in such a manner that driven transmission surfaces 821*a* are provided on the front side of the cutaways in the direction of rotation, so as to make contact with drive transmission surfaces 811*a* of the projecting portions 811 which are provided on the drive transmission gear 81. The contact surfaces of the drive transmission surfaces 811*a* and the driven transmission surfaces 821*a* are positioned on a line linking an arbitrary point on the circumference of the gear with the center thereof. Therefore, it is possible to make the direction of the force applied at the contacting surfaces match the direction of rotation C, and hence drive transmission loss can be suppressed. A substantially round hole 823 is provided in a central portion of the drive transmission plate 82, and a plurality of projecting portions 822 are provided as to project in the direction directed to the center of the hole. The position of the drive transmission plate 82 in the Y direction is restricted in one direction by abutting against the side surface of the drive transmission gear 81, and is restricted in the opposite direction by a restricting member (not illustrated) which is provided so as to engage with the pipe 83.

Next, second pipe recess grooves 832 are provided in the drive-side coupling side of one end of the pipe 83. The width of the second pipe recess grooves 832 in the circumferential direction in FIG. 14 (which shows a cross-section) is set to be larger than the width in the circumferential direction of the projecting portions 822 in the drive transmission plate 82. Furthermore, the diameter of the outer circumference of the pipe 83 is set to be smaller than the diameter of the hole 823 provided in the central portion of the drive transmission plate 82. The diameter of the inner circumference of the pipe 83 is configured to be slightly greater than the diameter of the outer circumference of the central projecting portion 812 provided on the drive transmission gear 81 so as to permit swinging movement. By configuring the central projecting portion 812 of the drive transmission gear 81 by a member which is flexible, it is possible to achieve a swinging movement even when there is no clearance between the inner circumference of the pipe 83 and the central projecting portion 812.

Here, as shown in FIG. 7, the phase of the second pipe recess grooves 832 which are provided in the pipe 83 at two positions on the opposite end to the end where the first pipe recess grooves 831 are provided is set to the same phase as the first pipe recess grooves 831 about the Y axis. As shown in FIG. 4 and FIG. 14, the second pipe recess grooves 832 are configured so as to engage with the drive transmission plate 82. The drive power from the drive transmission mechanism 24 is transmitted from the drive transmission gear 81 to the pipe 83, and from the pipe 83 to the shaft 131, via the drive transmission plate 82 and the pin 61 before and after the pipe 83. The configuration described above can be treated as a configuration in which the drive transmission gear 81 is a drive axle, the pipe 83 is an intermediate axle, and the shaft 131 is a driven shaft, a universal joint being provided at two points: between the shaft 131 and the pipe 83, and between the pipe 83 and the drive transmission gear 81. When there is divergence between the centers of the drive axle and the driven axle, if the phases of the recess grooves in the pipe 83, which corresponds to the intermediate axle, are not aligned, then a speed non-uniformity occurs between the drive axle and the driven axle. On the other hand, even when there is divergence between the centers of the drive axle and the driven axle, if the phases of the recess grooves in the pipe 83, which corresponds to the intermediate axle, are aligned, then the speed non-uniformity is cancelled out and drive transmission can be performed at uniform speed between the drive axle and the driven axle. In this way, it is possible to achieve highly accurate drive transmission by arranging the second pipe recess grooves 832 in the same phase as the first pipe recess grooves 831 about the Y axis. In the present embodiment, the second pipe recess grooves 832 are arranged in the same phase as the first pipe recess grooves 831 about the Y axis, but drive transmission is also possible even when the phases of the grooves are not aligned.

Here, the details of drive transmission from the drive transmission gear 81 to the pipe 83 will be described. The contacting portions in the drive transmission are provided at two positions: between the drive transmission surfaces 811a of the drive transmission gear 81 and the driven transmission surfaces 821a of the drive transmission plate 82, and between the projecting portions 822 of the drive transmission plate 82 and the second pipe recess grooves 832 of the pipe 83. The contacting surfaces of the drive transmission surfaces 811a and the driven transmission surfaces 821a are provided at a prescribed distance from the center of the drive transmission gear 81, and therefore it is possible to lower the force applied to the contacting surfaces in accordance with the distance from the center of the gear, in relation to the torque on the axle. In particular, it is possible to reduce the load applied to the drive transmission surface 811a in a gear component, which is often made from resin. Moreover, by providing a plurality of drive transmission surfaces 811a and driven transmission surfaces 821a, it is possible to distribute the load applied to the drive transmission surface 811a on the gear, in accordance with the number of surfaces provided.

Furthermore, the contacting surfaces between the projecting portions 822 of the drive transmission plate 82 and the second pipe recess grooves 832 of the pipe 83 are situated at a shorter distance from the center than the contacting surfaces between the drive transmission surfaces 811a and the driven transmission surfaces 821a. However, if the drive transmission plate 82 and pipe 83 is made of metal, then the strength increases with respect to the load, and highly accurate drive transmission becomes possible.

By means of the swinging mechanism of the cover member 62 described above, it is possible to transmit the rotary drive power transmitted from the drive transmission gear 81, to the shaft 131, accurately. On the other hand, since drive transmission can be performed even if the dimensional accuracy of the constituent parts of the drive transmission mechanism is not high, then it is possible to reduce the required level of dimensional accuracy, and therefore it is possible to reduce the manufacturing costs.

Second Embodiment

In the first embodiment, a swinging mechanism is described in which clearance portions 622b and a swing accommodating portion 622c are provided on the inner circumferential surface of the inner ring portion 622 of the cover member 62, in the roller-side coupling 60. In other words, in the first embodiment, the outer circumference of the inner ring portion 622 of the cover member 62 is fitted into and fixed to the inner circumferential surface of the pipe 83, and the curved surface portion on the inner circumference of the inner ring portion 622 makes contact in a slidable fashion with the outer circumferential surface of the shaft 131. The second embodiment of the present invention is characterized in having a configuration that is the reverse of the first embodiment. Below, parts of the configuration which are common with the first embodiment are labelled with the same reference numerals and description thereof is omitted here. Matters which are not described here are similar to the first embodiment.

FIG. 15 is a schematic cross-sectional diagram for illustrating the configuration of the present embodiment, and corresponds to section A-A in FIG. 9. As shown in FIG. 15, in the present embodiment, clearance portions 1622b are provided in the outer circumferential surface of the inner ring portion 1622 of the cover member 162, about the entire circumference of both ends in the Y direction. The clearance portions 1622b are configured so as not to contact the inner circumferential surface of the pipe 83, when in a load-less state. On the other hand, a swing accommodating portion 1622c is formed in a portion of the outer circumferential surface of the inner ring portion 1622 apart from both end portions in the Y direction. The swing accommodating portion 1622c is configured so as to contact the inner circumferential surface of the pipe 83, when in a load-less state. Moreover, the positions in the Y direction of the through hole 131b of the shaft 131 and the pin 61 are arranged so as to substantially match the swing accommodating portion 622c in the Y direction. In other words, in the present embodiment, the inner circumference of the inner ring portion 1622 of the cover member 162 is fitted onto and fixed to the outer circumferential surface of the shaft 131 (externally fitting portion), and a curved surface portion having a convex cross-section in the radially outward direction of the outer circumference of the inner ring portion 1622 makes contact with the inner circumferential surface of the pipe 83, in a swingable fashion. The mechanism of the sliding movement is similar to the first embodiment.

By adopting a configuration of this kind, even if divergence occurs in the alignment of the shaft 131 and the pipe 83 in terms of the lengthwise central axes, the cover member 162 is able to rotate in unison with the shaft 131 about the pin 61 and drive transmission can be performed. In other words, it is possible to treat the cover member 162 as having a swinging mechanism between the pipe 83 and the shaft 131. The range of swinging movement is restricted by contact between the clearance portions 1622b of the cover member 162 and the inner circumferential surface of the pipe 83. Furthermore, in the present embodiment, the clearance portions 1622b are provided about the whole circumference of the end portions of the outer circumferential surface of the inner ring portion 1622, but the clearance portions 1622b do not have to be provided about the whole circumference, provided that they do not impede the swinging movement of the cover member 162 about the pin 61.

Furthermore, the clearance portions 1622b and the swing accommodating portion 1622c are desirably configured so as to have a circular arc shape centered on the pin 61. By adopting this configuration, even when in a swinging state, the inner ring portion 1622 of the cover member 162 and the inner circumferential surface of the pipe 83 make contact with each other at all times, and more accurate drive transmission can be achieved. By making the inner ring portion 1622 of the cover member 162 from a member that is flexible, it is possible to achieve a swinging mechanism even if there is no clearance between the inner ring portion 1622 of the cover member 162 and the pipe 83.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-252048, filed Dec. 12, 2014 which is hereby incorporated by reference herein in its entirety.

What is claimed is:

1. A drive apparatus comprising:
   a first rotary member;
   a second rotary member, which is provided with an axle hole, and which receives drive power from the first rotary member or transmits the drive power to the first rotary member;
   an axle member, which is inserted into the axle hole in the second rotary member and engages with the first rotary member so as to transmit the drive power between the first rotary member and the second rotary member; and
   a coupling member for coupling the first rotary member and the second rotary member,
   the coupling member including a supporting portion which is disposed between the first rotary member and the second rotary member in a radial direction, and
   a restricting portion which restricts departure of the axle member from the axle hole in the second rotary member,
   wherein the first rotary member has a width larger than an outer diameter of the axle member and includes a recess portion which contacts with the axle member.

2. The drive apparatus according to claim 1, wherein the supporting portion is configured to allow a divergence between an axis of the first rotary member and an axis of the second rotary member to occur in such a state that the first rotary member and the second rotary member rotate integrally with each other.

3. The drive apparatus according to claim 1, wherein the axle member is a pin made of metal.

4. The drive apparatus according to claim 1, wherein the axle member is inserted into the axle hole in a non-indented state, and departure thereof from the axle hole is restricted by the restricting portion.

5. The drive apparatus according to claim 1, wherein the coupling member includes an outer ring portion and an inner ring portion, the supporting portion being provided on the inner ring portion and the restricting portion being provided on the outer ring portion.

6. The drive apparatus according to claim 1, wherein the first rotary member is made of metal.

7. The drive apparatus according to claim 1, wherein the coupling member is an integrally formed member.

8. The drive apparatus according to claim 1, wherein the supporting portion has a convex shape in a direction from the first rotary member towards the second rotary member, when viewed in a direction orthogonal to an axial line of the second rotary member.

9. The belt unit according to claim 1, wherein the recess portion is positioned between the coupling member and the second rotary member with respect to an insertion direction of the axle member in such state that the recess portion and the axle member contact each other.

10. A belt unit to which drive power is transmitted from a first rotary member provided in an image forming apparatus, the belt unit comprising:
    an endless belt;
    a second rotary member which enables rotary movement of the belt by receiving the drive power from the first rotary member, and which includes an axle hole provided so as to open in a circumferential surface of the second rotary member and so as to extend in a direction perpendicular to an axial line of the second rotary member;
    an axle member, which is inserted into the axle hole and engages with the first rotary member so as to transmit the drive power between the first rotary member and the second rotary member; and
    a coupling member for coupling the first rotary member and the second rotary member,
    the coupling member including a supporting portion which is disposed between the first rotary member and the second rotary member in a radial direction, and
    a restricting portion which restricts departure of the axle member from the axle hole in the second rotary member,
    wherein the first rotary member has a width larger than an outer diameter of the axle member and includes a recess portion which contacts with the axle member.

11. The belt unit according to claim 10, wherein the axle member is a pin made of metal.

12. The belt unit according to claim 11, wherein the axle member is inserted into the axle hole in a non-indented state, and departure thereof from the axle hole is restricted by the restricting portion.

13. The belt unit according to claim 11, wherein the coupling member includes an outer ring portion and an inner ring portion, the supporting portion being provided on the inner ring portion and the restricting portion being provided on the outer ring portion.

14. The belt unit according to claim 11, wherein the first rotary member is made of metal.

15. The belt unit according to claim 11, wherein the coupling member is an integrally formed member.

16. The belt unit according to claim 11, wherein the supporting portion has a convex shape in a direction from the first rotary member towards the second rotary member, when viewed in a direction orthogonal to an axial line of the second rotary member.

17. The belt unit according to claim 10, wherein the recess portion is positioned between the coupling member and the second rotary member with respect to an insertion direction of the axle member in such state that the recess portion and the axle member contact with each other.

* * * * *